(12) United States Patent
Bräuninger et al.

(10) Patent No.: US 9,997,791 B2
(45) Date of Patent: Jun. 12, 2018

(54) MEMBRANE ELECTRODE UNITS FOR HIGH TEMPERATURE FUEL CELLS WITH IMPROVED STABILITY

(71) Applicants: Sigmar Bräuninger, Hemsbach (DE); Detlef Ott, Sulzbach (DE); Jörg Belack, Damscheid (DE); Moritz Ehrenstein, Madison, NJ (US); Seonghan Yu, Belle Mead, CT (US); Andrew Van Dyke, Bridgewater, NJ (US); Emory S. De Castro, Nahant, MA (US)

(72) Inventors: Sigmar Bräuninger, Hemsbach (DE); Detlef Ott, Sulzbach (DE); Jörg Belack, Damscheid (DE); Moritz Ehrenstein, Madison, NJ (US); Seonghan Yu, Belle Mead, CT (US); Andrew Van Dyke, Bridgewater, NJ (US); Emory S. De Castro, Nahant, MA (US)

(73) Assignee: BASF SE (DE)

( * ) Notice: Subject to any disclaimer, the term of this patent is extended or adjusted under 35 U.S.C. 154(b) by 334 days.

(21) Appl. No.: 14/473,191

(22) Filed: Aug. 29, 2014

(65) Prior Publication Data
US 2015/0064599 A1 Mar. 5, 2015

Related U.S. Application Data

(60) Provisional application No. 61/872,792, filed on Sep. 2, 2013.

(51) Int. Cl.
*H01M 8/0271* (2016.01)
*H01M 8/0273* (2016.01)
*H01M 8/1004* (2016.01)
*H01M 8/103* (2016.01)
*H01M 8/1067* (2016.01)
*H01M 8/0284* (2016.01)
*H01M 8/1088* (2016.01)
*H01M 8/1018* (2016.01)

(52) U.S. Cl.
CPC ....... *H01M 8/0273* (2013.01); *H01M 8/0284* (2013.01); *H01M 8/103* (2013.01); *H01M 8/1004* (2013.01); *H01M 8/1067* (2013.01); *H01M 8/1088* (2013.01); *H01M 2008/1095* (2013.01); *Y02P 70/56* (2015.11)

(58) Field of Classification Search
None
See application file for complete search history.

(56) References Cited

U.S. PATENT DOCUMENTS 5,464,700 A 11/1995 Steck et al.
5,738,905 A 4/1998 Bevers
(Continued)

FOREIGN PATENT DOCUMENTS

DE 195 09 748 A1 10/1996
DE 195 09 749 A1 10/1996
(Continued)

*Primary Examiner* — Alix E Eggerding
(74) *Attorney, Agent, or Firm* — Drinker Biddle & Reath LLP

(57) ABSTRACT

The present invention relates to membrane electrode units (MEU) for high temperature fuel cells having an improved stability and a process for their manufacture.

18 Claims, 14 Drawing Sheets

Alternative sub gasket configuration. Use two additional thin sub gaskets on each side. Sub gasket ensemble is both an alignment tool and means to avoid over compression

- Internal Gaskets (Ultrason)
- Gas Diffusion Electrode
- Catalyst
- Membrane
- Internal Gaskets (Ultrason): two thin gaskets on each side of the thick "hard stop" gasket

(56) References Cited

U.S. PATENT DOCUMENTS

| | | |
|---|---|---|
| 5,761,793 A | 6/1998 | Bevers et al. |
| 6,103,077 A | 8/2000 | DeMarinis et al. |
| 2004/0075172 A1 | 4/2004 | Bauer et al. |
| 2004/0118773 A1 | 6/2004 | Uensal et al. |
| 2004/0131909 A1* | 7/2004 | Soczka-Guth ..... B01D 67/0088 429/493 |
| 2004/0247974 A1 | 12/2004 | Uensal et al. |
| 2005/0074654 A1 | 4/2005 | Kiefer et al. |
| 2006/0014065 A1 | 1/2006 | Pawlik et al. |
| 2006/0105215 A1* | 5/2006 | Panambur ............. C08J 5/2275 429/483 |
| 2008/0057358 A1 | 3/2008 | Calundann et al. |
| 2012/0122013 A1* | 5/2012 | Schmidt ................ C08J 5/2256 429/481 |
| 2014/0199610 A1 | 7/2014 | Benicewicz et al. |

FOREIGN PATENT DOCUMENTS

| | | |
|---|---|---|
| DE | 197 57 492 A1 | 7/1999 |
| DE | 10235360 A1 | 2/2004 |
| DE | 10245451 A1 | 4/2004 |
| EP | 1337319 A1 | 8/2003 |
| EP | 1368845 | 12/2003 |
| EP | 1373379 A2 | 1/2004 |
| EP | 1379573 A1 | 1/2004 |
| EP | 1425336 A2 | 6/2004 |
| JP | 2001-196082 A | 7/2001 |
| WO | WO-92/15121 A1 | 9/1992 |
| WO | WO-96/13872 A1 | 5/1996 |
| WO | WO-00/26982 A2 | 5/2000 |
| WO | WO-00/44816 A1 | 8/2000 |
| WO | WO-01/18894 A2 | 3/2001 |
| WO | WO-2006008158 A2 | 1/2006 |

* cited by examiner

Figure 1. Standard Subgasket configuration, FEP-coated polyimide
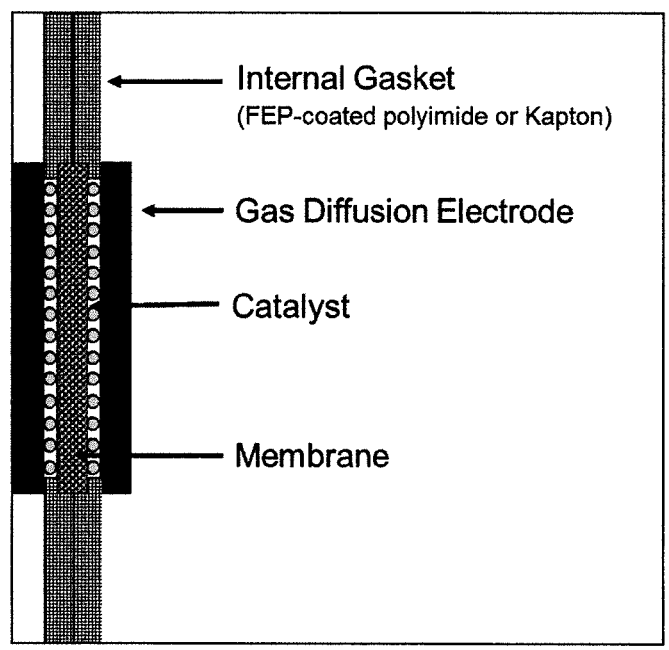
Legend
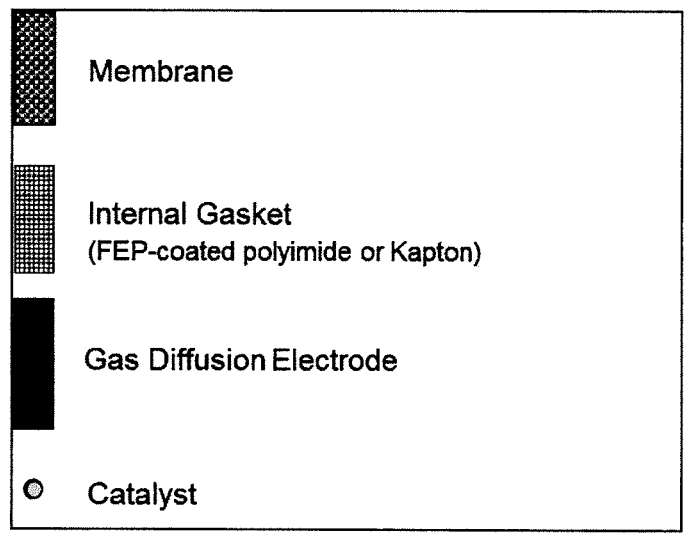

Figure 2. Current standard assembly for FEP-coated polyimide sub gasket
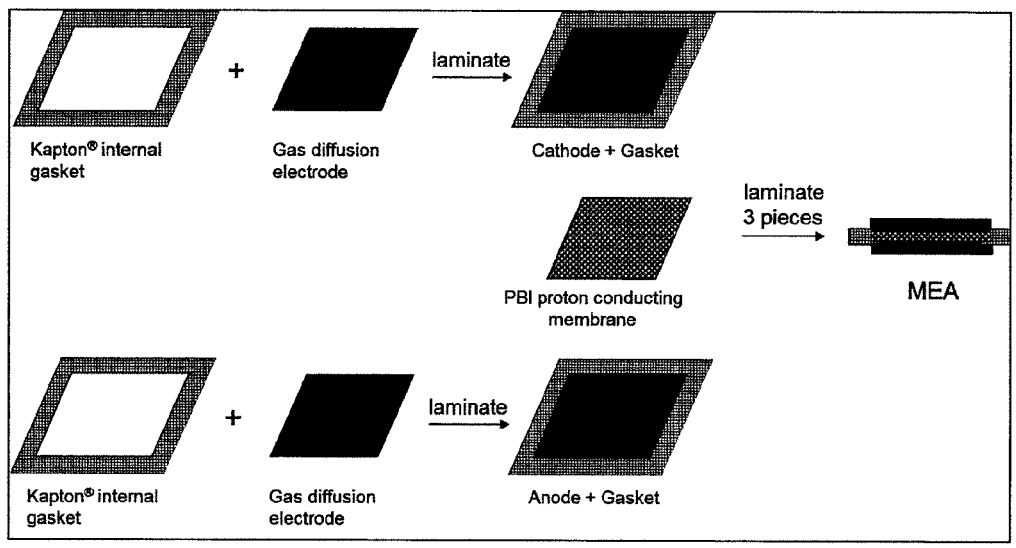

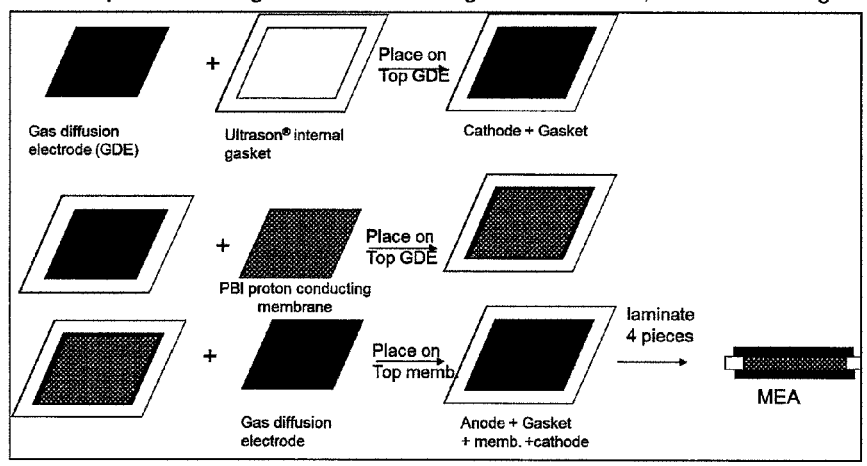
Figure 3. Use of sub gasket as an alignment element. New assembly sequence. For clarity, a first step of laminating GDE to a thin sub gasket is omitted, but shown in Figure 5.

Figure 4. Schematic of new sub gasket as a membrane alignment element
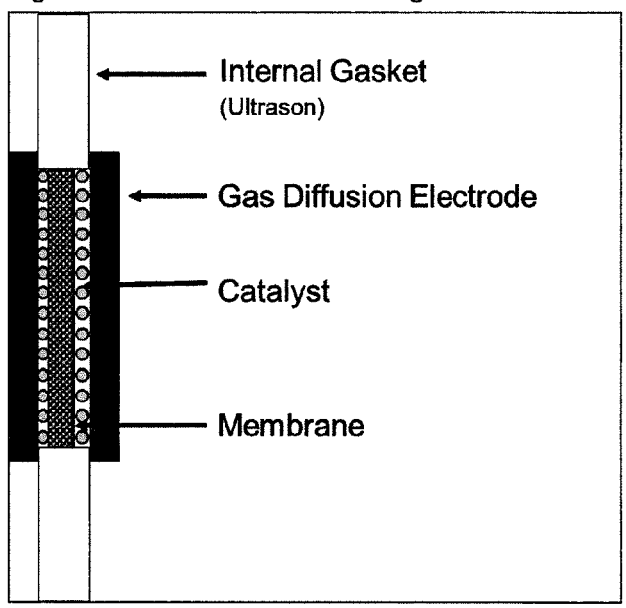
Legend
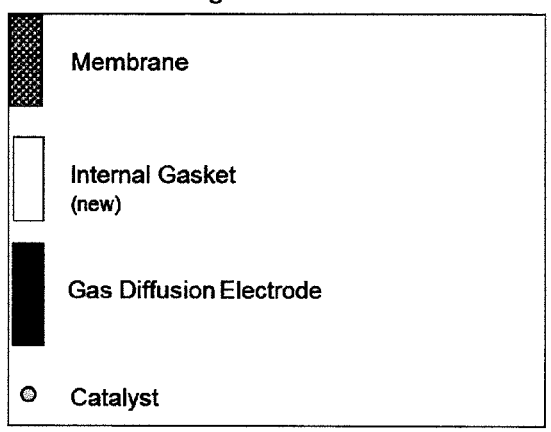

Figure 5. Alternative sub gasket configuration. Use two additional thin sub gaskets on each side. Sub gasket ensemble is both an alignment tool and means to avoid over compression
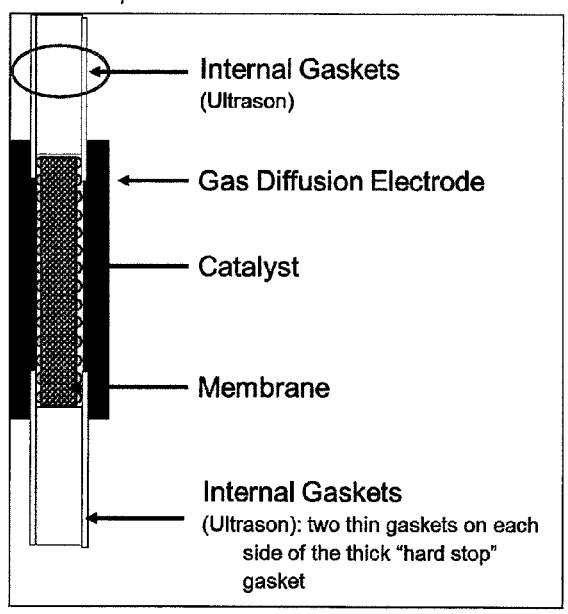

Figure 6. Electrochemical stability of Ultrason P compared to Ultrason E. Polarization curves after six polarization cycles (0-0.7A/cm$^2$). Reformate/air at 180°C, stoich: 1.2/2 reformate / air, reformate = 70% $H_2$, 28% $CO_2$, 2% CO
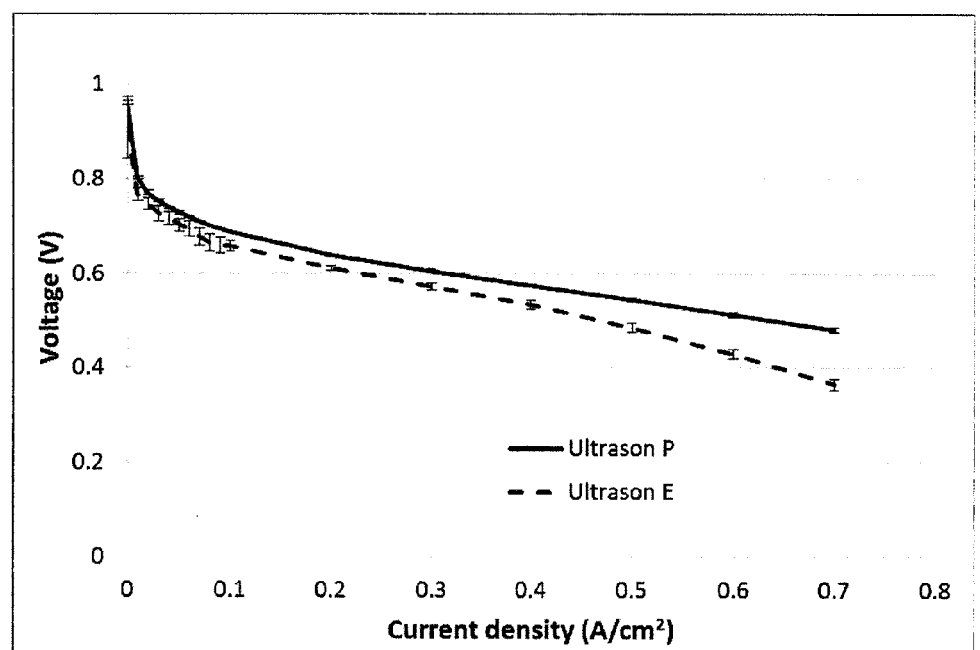

Figure 7. Lifetime data for three types of sub gasket. T=160°C pressure=1 $bar_a$, stoich: 1.2/2 $H_2$/air
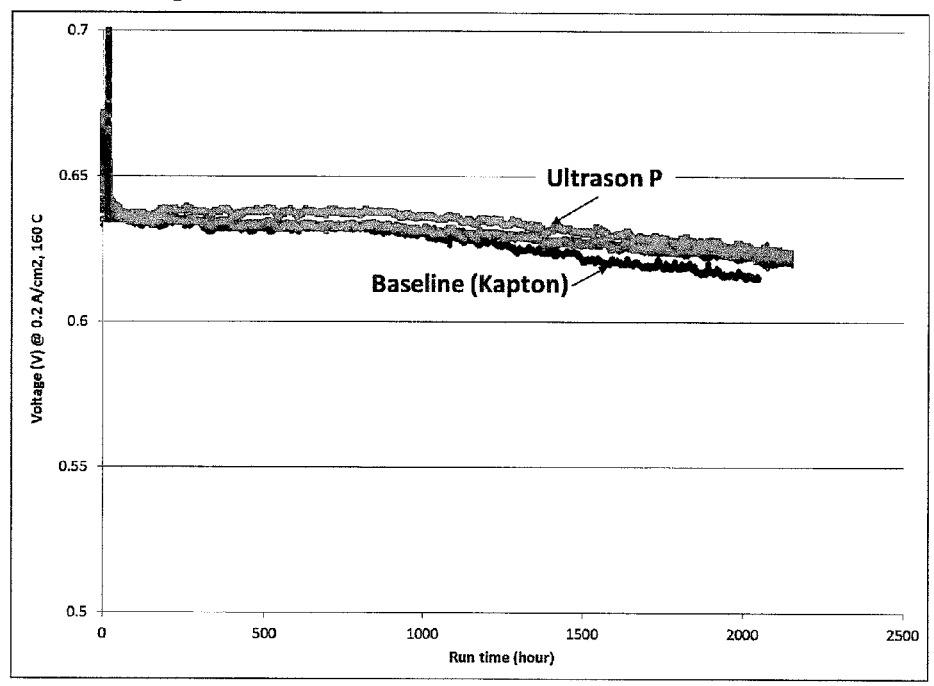

Figure 8. Ultrason E after 1,000 hr operation, $H_2$/air. Arrows note cracks
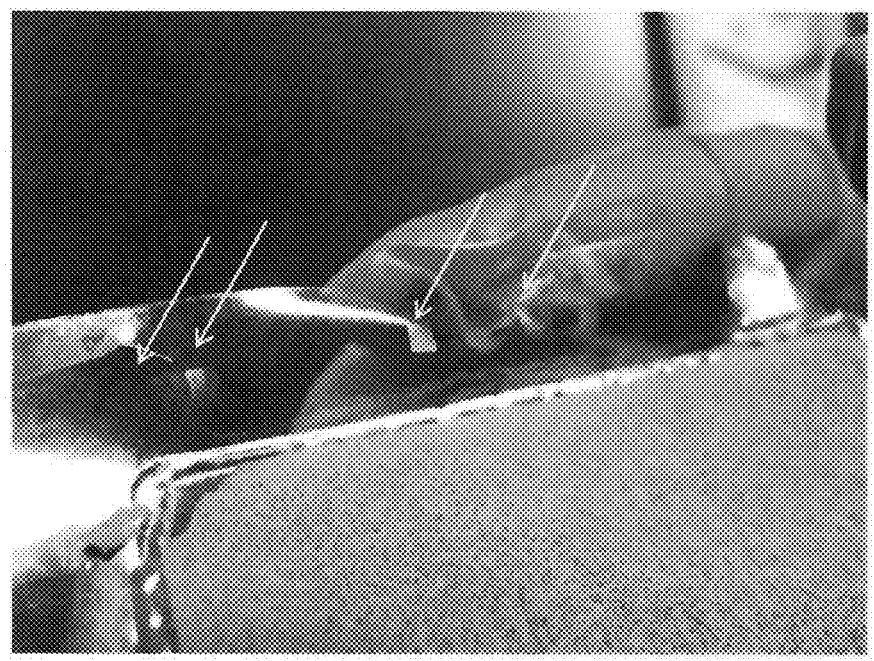

Figure 9. Ultrason P after 2,000 hr operation, same conditions as Error! Reference ource not found..
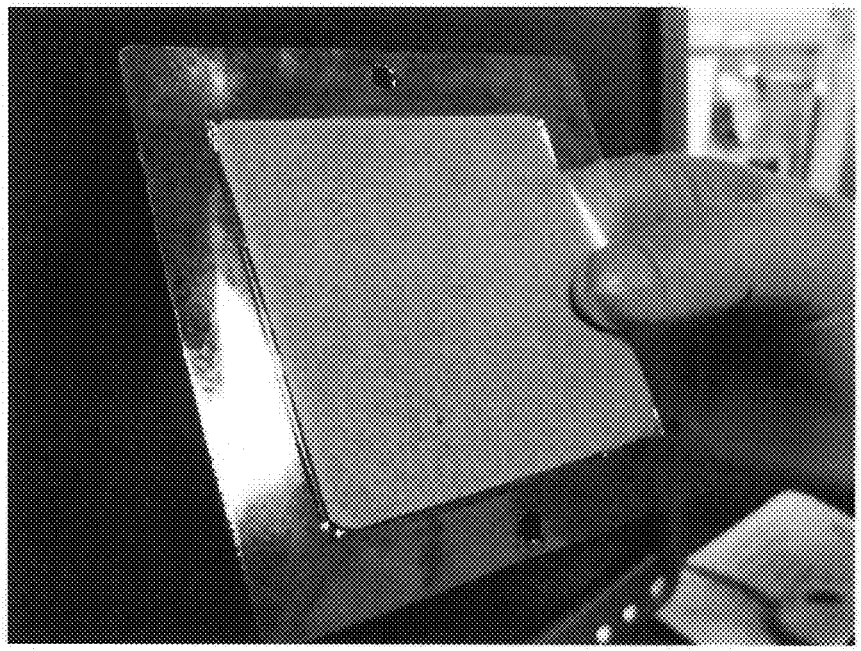

Figure 10: MEU as Example 4, 100 micron Ultrason P as an alignment element and membrane compression control in Reformate/Air (1.2/2.0 stoichiometry) at 180°C.
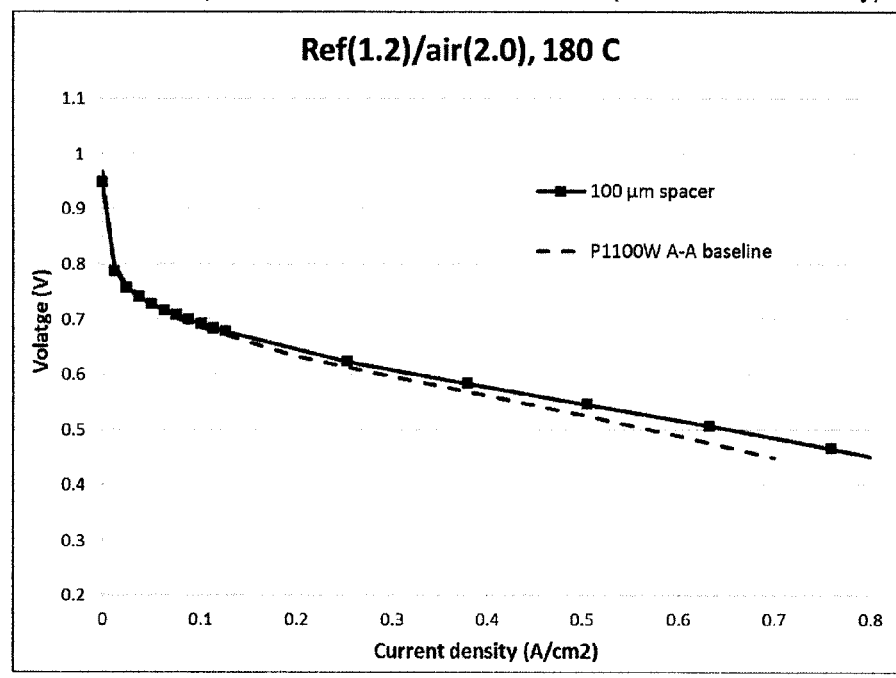

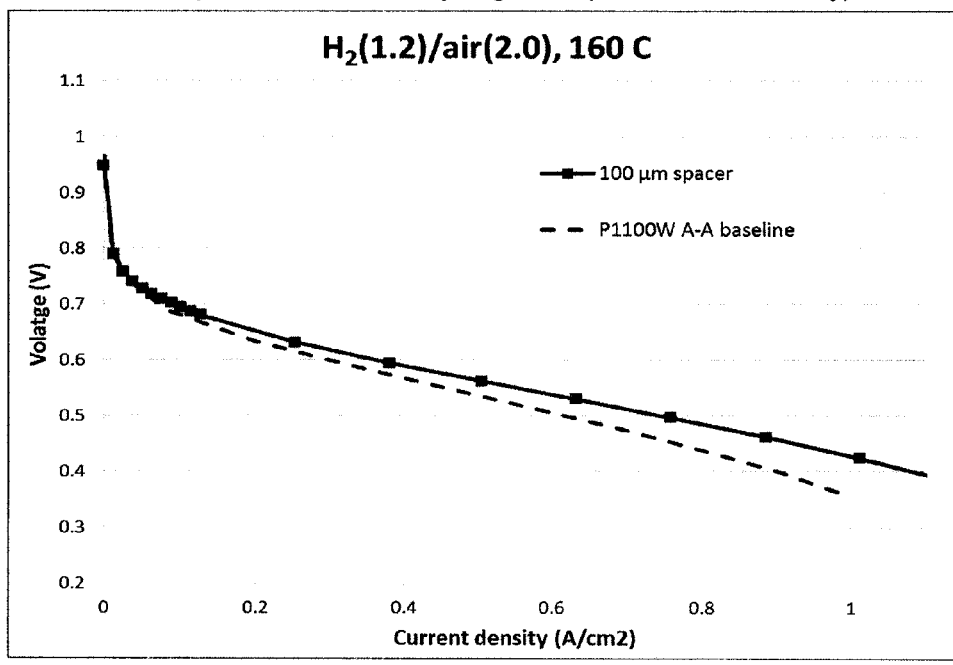
Figure 11: MEU as Example 5, 100 micron Ultrason P as an alignment element and membrane compression control in Hydrogen/Air (1.2/2.0 stoichiometry) at 160°C Figure 12: MEU as Example 5, 250 micron Ultrason P as an alignment element and membrane compression control in Reformate/Air (1.2/2.0 stoichiometry) at 180°C.
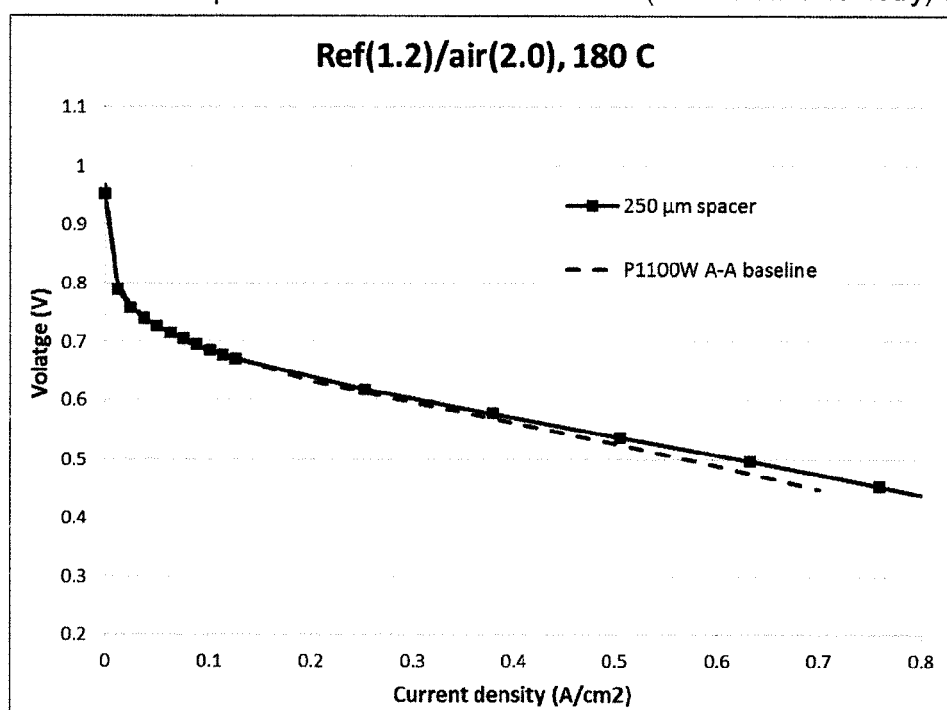

Figure 13: MEU as Example 5, 250 micron Ultrason P as an alignment element and membrane compression control in Hydrogen/Air (1.2/2.0 stoichiometry) at 160°C
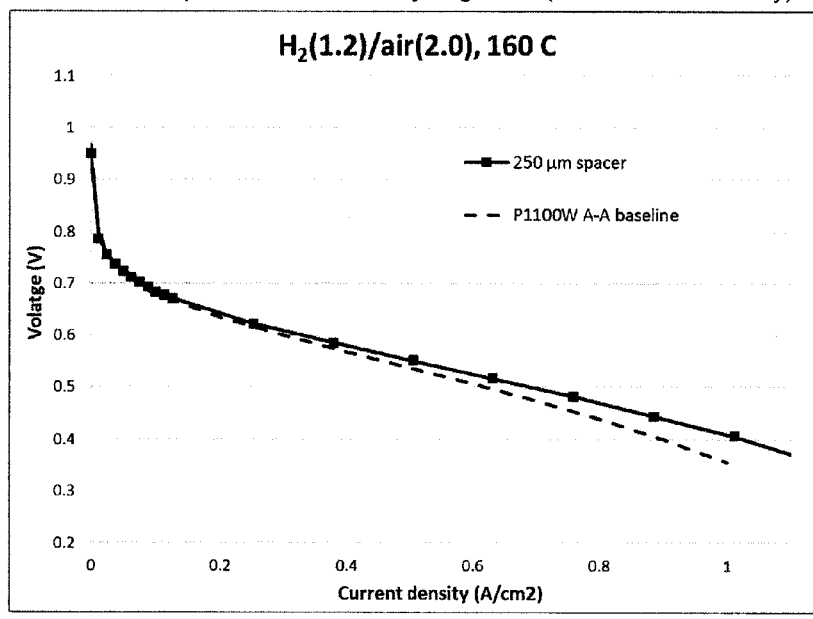

Figure 14: Long term operation of MEUs as in Example 4&5, 100 micron and 250 micron Ultrason P as an alignment element and membrane compression control in Hydrogen/Air (1.2/2.0 stoichiometry) at 160°C, constant current operation at 0.2A/cm².
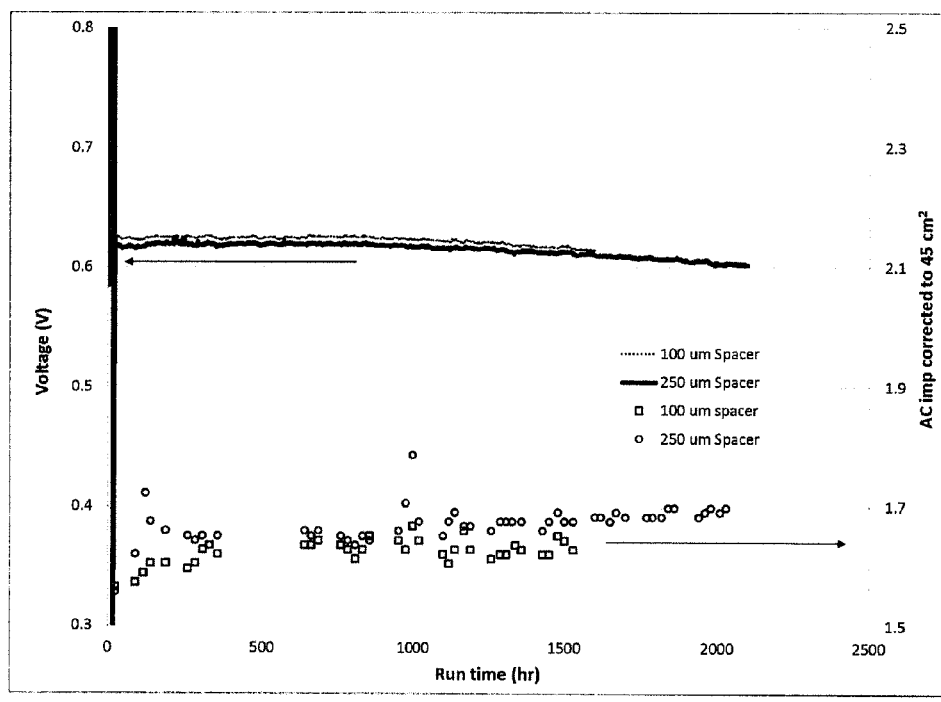

MEMBRANE ELECTRODE UNITS FOR HIGH TEMPERATURE FUEL CELLS WITH IMPROVED STABILITY

CROSS-REFERENCE TO RELATED APPLICATIONS

This application claims benefit of U.S. Application No. 61/872,792, filed Sep. 2, 2013, which is incorporated herein by reference in its entirety.

The present invention relates to membrane electrode units (MEU) for high temperature fuel cells having an improved stability and a process for their manufacture.

In fuel cell technology, most polymer electrolyte membranes (PEM) are based on sulphonic acid-modified polymers/perfluorinated polymers are used, such as Nafion™ from DuPont de Nemours, Wilmington, USA. For the conduction of protons, such polymer electrolyte membranes require relatively high water content in the membrane which typically amounts to 4-20 molecules of water per sulphonic acid group. The required water content, but also the stability of the polymer in connection with acidic water and the reaction gases hydrogen and oxygen, restricts the operating temperature of the PEM fuel cell stack to 80-100° C. Higher operating temperatures, e.g. operating pressurized, cannot be implemented without a decrease in performance of the fuel cell. At temperatures higher than the dew point of water for a given pressure level, the membrane dries out completely and the fuel cell provides no more electric power as the resistance of the membrane increases to such high values that an appreciable current flow no longer occurs.

A membrane electrode unit with integrated gasket based on the technology set forth above is described, for example, in U.S. Pat. No. 5,464,700. Here, in the outer area of the membrane electrode unit, films made of elastomers are provided on the surfaces of the membrane that are not covered by the electrode which simultaneously constitute the gasket to the bipolar plates and the outer space.

By means of this measure, savings on very expensive membrane material can be made up to 100° C. It is not possible to achieve higher working temperatures with elastomers. Therefore, the method described herein is not suitable for fuel cells with operating temperatures of more than 100° C.

Due to system-specific reasons, however, operating temperatures in the fuel cell of more than 100° C. are desirable. The activity of the catalysts based on noble metals and contained in the membrane electrode unit (MEU) is significantly improved at high operating temperatures. Especially when the so-called reformates from hydrocarbons are used, the reformer gas contains considerable amounts of carbon monoxide which usually have to be removed by means of an elaborate gas conditioning or gas purification process. The tolerance of the catalysts to the CO impurities is increased at high operating temperatures.

Furthermore, heat is produced during operation of fuel cells. However, the cooling of these systems to less than 80° C. can be very complex. Depending on the power output, the cooling devices can be constructed significantly less complex. This means that the waste heat in fuel cell systems that are operated at temperatures of more than 100° C. can be utilised distinctly better and therefore the efficiency of the fuel cell system can be increased.

To achieve these temperatures, in general, membranes with new conductivity mechanisms are used. One approach to this end is the use of membranes which show ionic conductivity without employing water. The first promising development in this direction is set forth in the document WO96/13872. However, this new class of polymer electrolyte membranes is different from the polymer electrolyte membranes based on sulphonic acid-modified polymers/perfluorinated polymers, such as Nafion™ as required different handling and manufacturing techniques.

In the art of MEU for high temperature fuel cells based on polymer electrolyte membranes (PEM) which can be operated above 100° C. without any humidification, the limited mechanical stability of the polymer electrolyte membranes (PEM) most typically required the use of so-called subgaskets or sophisticated gasket designs. To this end, two electrodes are pressed onto the membrane, each of which only covers part of the two main surfaces of the membrane. Most typically, a PTFE gasket is pressed onto the remaining exposed part of the main surfaces of the membrane in the cell such that the gas spaces of anode and cathode are sealed in respect to each other and the environment. However, it was found that a membrane electrode unit produced in such a way only exhibits high durability with very small cell surface areas of 1 $cm^2$. If bigger cells, in particular with a surface area of at least 10 $cm^2$, are produced, the durability of the cells at temperatures of more than 150° C. is limited to less than 100 hours.

Another high-temperature fuel cell is disclosed in document JP-A-2001-1960982. In this document, an electrode membrane unit is presented which is provided with a polyimide gasket. However, the problem with this structure is that for sealing two membranes are required between which a seal ring made of polyimide is provided. As the thickness of the membrane has to be chosen as little as possible due to technical reasons, the thickness of the seal ring between the two membranes described in JP-A-2001-196082 is extremely restricted. It was found in long-term tests that such a structure is likewise not stable over a period of more than 1000 hours.

Furthermore, DE 10235360 describes a membrane electrode unit that contains polyimide layers for sealing. These layers have a uniform thickness such that the boundary area is thinner than the area being in contact with the membrane. The membrane electrode units mentioned above are generally connected with planar bipolar plates which include channels for a flow of gas milled into the plates. As part of the membrane electrode units has a higher thickness than the gaskets described above, a gasket is inserted between the gasket of the membrane electrode units and the bipolar plates which is usually made of PTFE. To avoid such gasket more sophisticated bipolar plates are required which causes higher costs. It was found in long-term tests that such a structure is likewise more stable than before, however, in long term testing of more than 3000 hours the stability still needs to be improved further.

In the above examples, the sub gasket serves the purpose of minimizing expensive membrane, provides a stable surface for sealing gaskets that make a gas-tight seal around the MEA and with the bipolar plates, while at the same time must be stable under acidic, thermal, and electrochemical forces that promote degradation.

Furthermore, the use of a sub gasket as a frame around the MEU provides a certain degree of complexity when alignment of the assembly of electrodes, membrane, and frame. Typically this alignment is accomplished through either highly skilled assemblers, or machines. However, even with highly skilled workers, one may be subject to unwanted variations in alignment; use of machines presents an advantage, but then loss of alignment may occur in time as the machine tools age, lose tolerance and/or corrode in the acid environment of this system.

Finally, for membrane systems that rely on metering out a certain amount of acid into the catalyst layer as the electrodes are laminated to the membrane, there is a need for controlled compression of the membrane, and maintaining a fixed distance between the anode and cathode. Typical high temperature membranes creep in time, and are not rigid enough to maintain a controlled gap between the anode and cathode of the membrane electrode unit.

Therefore, it is an object of the present invention to provide a MEU design having an improved stability over several thousand hours and a process for the manufacture of such MEU employing polymer electrolyte membrane being operational above 100° C. without any humidification.

The MEU provided should have the following properties:
(i) the cells should exhibit a long service life during operation at temperatures of more than 100° C.,
(ii) the individual cells should exhibit a consistent or improved performance at temperatures of more than 100° C. over a long period of time,
(iii) the fuel cells should have a high open circuit voltage as well as a low gas crossover after a long operating time,
(iv) it should be possible to employ the fuel cells in particular at operating temperatures of more than 100° C. and without additional fuel gas humidification,
(v) the membrane electrode units should in particular be able to resist permanent or alternating pressure differences between anode and cathode and
(vi) the membrane electrode unit should be readily produced with an inexpensive process, while still maintaining high levels of alignment tolerance amongst elements after several thousands of assembly cycles.

It was now found that MEU employing polymer electrolyte membrane being operational above 100° C. without any humidification can be accomplished by a unique design and material combination.

Thus the present invention relates to a membrane electrode unit (MEU) having
(i) two gas diffusion layers that are each in contact with a catalyst layer and being separated by a polymer electrolyte membrane,
(ii) both surfaces of the polymer electrolyte membrane are in contact with said catalyst layer, said catalyst layers being in contact with said gas diffusion layers,
(iii) the side surface of the polymer electrolyte membrane being surrounded by and in contact with the side surface of a polymer frame over its entire side surface,
(iv) the surface of said polymer frame overlapping with the outer peripheral area of the two gas diffusion layers that are each in contact with a catalyst layer,
(v) the thickness of the polymer frame and the polymer electrolyte membrane are about equal,
(vi) the polymer electrolyte membrane being operational above 100° C. without any humidification,
(vii) the polymer frame is made from polymers based on polysulphone.

A BRIEF DESCRIPTION OF THE FIGURES

FIG. 1 illustrates the standard Subgasket configuration, FEP-coated polyimide.
FIG. 2 illustrates current standard assembly for FEP-coated polyimide sub gasket.
FIG. 3 illustrates the use of sub gasket as an alignment element.

FIG. 4 illustrates a schematic of new sub gasket as a membrane alignment element.
FIG. 5 illustrates an alternative sub gasket configuration. Use two additional thin sub gaskets on each side. Sub gasket ensemble is both an alignment tool and means to avoid over compression.
FIG. 6 shows Ultrason P compared to Ultrason E after six polarization cycles whereby the current load is varied from zero to 0.7 A/cm2.
FIG. 7 illustrates the loss of integrity.
FIG. 8 illustrates a picture of cracks that develop in the Ultrason E sub gasket after 1,000 hours of operation.
FIG. 9 illustrates after 2,000 hours of operation for Ultrason P, the sub gasket appears intact and malleable
FIG. 10 demonstrates that by assembling a MEU as in Example 4 (100 micron Ultrason P as an alignment element), one can maintain consistent compression during assembly.
FIG. 11 illustrates the cathode side improvement.
FIGS. 12 and 13 demonstrate similar improvements now with a 250 micron spacer.
FIG. 14 shows long term performance, especially the lower trace tracking cell resistance.

Preferably the polysulphone forming the polymer frame contains recurring units with linking sulphone groups defined by the general formulae A, B, C, D, E, F, G and/or H:

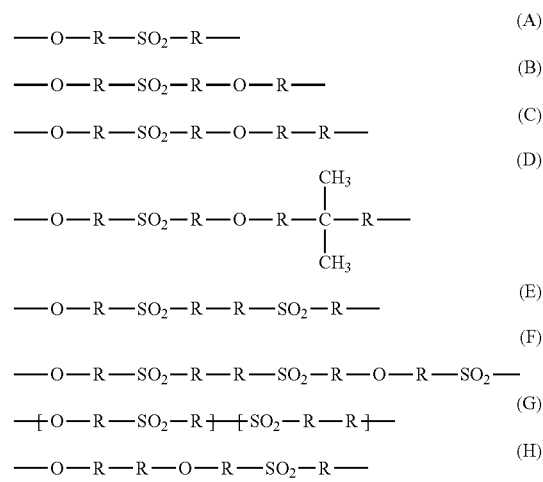

wherein the functional groups R, independently of another, are identical or different and represent aromatic or heteroaromatic groups.

Preferably the functional groups R in formulae A, B, C, D, E, F, G and/or H are 1,2-phenylene, 1,3-phenylene, 1,4-phenylene, 4,4'-biphenyl, pyridine, quinoline, naphthalene or phenanthrene. Most preferred are functional groups R in formulae A, B, C, D, E, F, G and/or H are 1,2-phenylene, 1,3-phenylene, 1,4-phenylene or 4,4'-biphenyl. In particular preferred are functional groups R in formulae C and H is 1,4-phenylene.

The polysulphones preferred within the scope of the present invention include homopolymers and copolymers, for example random copolymers. Particularly preferred polysulphones comprise recurring units of the formulae H to O:

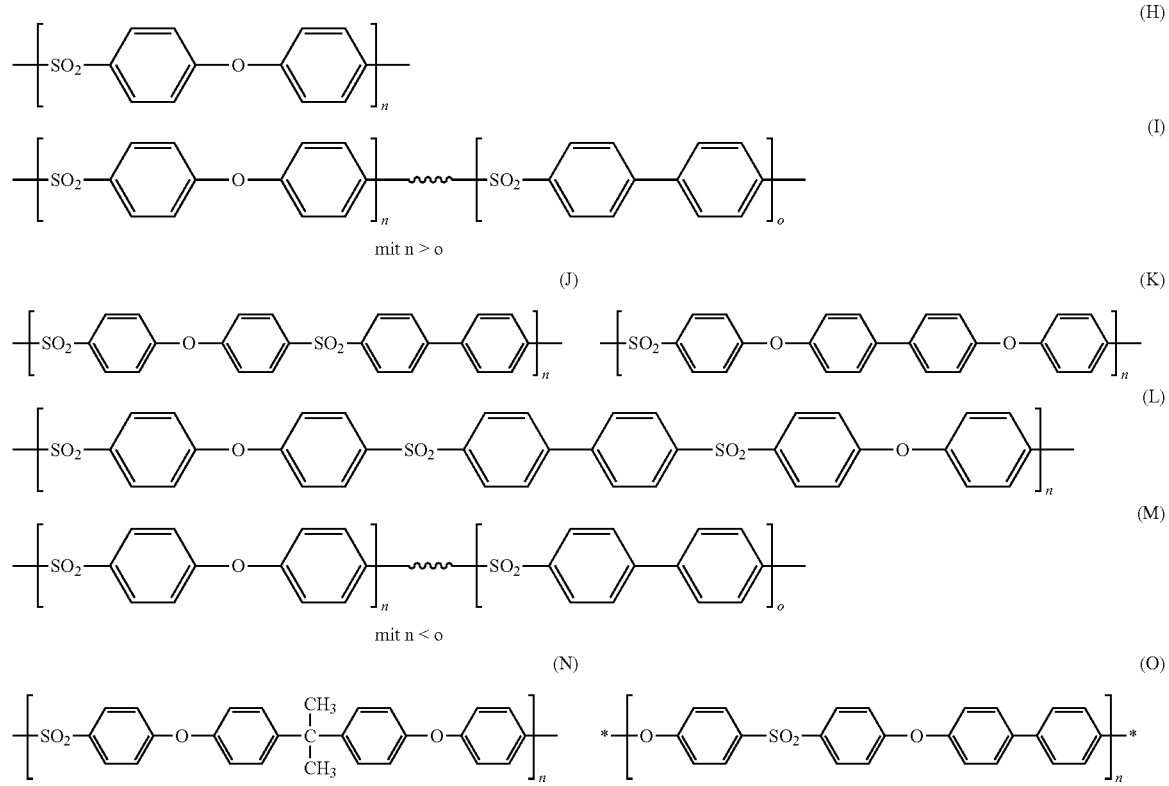

Most preferred are polysulphones of the formulae (K) and (O).

The polysulphones described above can be obtained commercially under the trade names ®Victrex 200 P, ®Victrex 720 P, ®Ultrason E, ®Ultrason S, ®Ultrason P, ®Mindel, ®Radel A, ®Radel R, ®Victrex HTA, ®Astrel and ®Udel.

Polymer Electrolyte Membranes

For the purposes of the present invention, suitable polymer electrolyte membranes are known per se. In general, membranes are employed for this, which comprise acids, wherein the acids may be covalently bound to the polymers or imbibed and coordinated through acid-base interaction with the polymer forming the membrane. Thus any flat material being doped with an acid can be used as suitable membrane. These membranes can, amongst other methods, be produced by swelling flat materials, for example a polymer film, with a fluid comprising acidulous compounds, or by manufacturing a mixture of polymers and acidulous compounds and the subsequent formation of a membrane by forming a flat structure and following solidification in order to form a membrane.

Preferred polymers include, amongst others, polyolefines, such as poly(chloroprene), polyacetylene, polyphenylene, poly(p-xylylene), polyarylmethylene, polystyrene, polymethylstyrene, polyvinyl alcohol, polyvinyl acetate, polyvinyl ether, polyvinyl amine, poly(N-vinyl acetamide), polyvinyl imidazole, polyvinyl carbazole, polyvinyl pyrrolidone, polyvinyl pyridine, polyvinyl chloride, polyvinylidene chloride, polytetrafluoroethylene, polyhexafluoropropylene, copolymers of PTFE with hexafluoropropylene, with perfluoropropylvinyl ether, with trifluoronitrosomethane, with carbalkoxyperfluoroalkoxyvinyl ether, polychlorotrifluoroethylene, polyvinyl fluoride, polyvinylidene fluoride, polyacrolein, polyacrylamide, polyacrylonitrile, polycyanoacrylates, polymethacrylimide, cycloolefinic copolymers, in particular of norbornenes; polymers having C—O bonds in the backbone, for example polyacetal, polyoxymethylene, polyether, polypropylene oxide, polyepichlorohydrin, polytetrahydrofuran, polyphenylene oxide, polyether ketone, polyester, in particular polyhydroxyacetic acid, polyethyleneterephthalate, polybutyleneterephthalate, polyhydroxybenzoate, polyhydroxypropionic acid, polypivalolacton, polycaprolacton, polymalonic acid, polycarbonate;

Polymeric C—S-bounds in the backbone, for example, polysulphide ether, polyphenylenesulphide, polyethersulphone, polysulphone, polymeric C—N bonds in the backbone, for example polyimines, polyisocyanides, polyetherimine, polyetherimides, polyaniline, polyaramides, polyamides, polyhydrazides, polyurethanes, polyimides, polyazoles, polyazole ether ketone, polyazines; liquid crystalline polymers in particular Vectra as well as inorganic polymers, such as polysilanes, polycarbosilanes, polysiloxanes, polysilicic acid, polysilicates, silicons, polyphosphazenes and polythiazyl.

Preferred herein are alkaline polymers, wherein this particularly applies to membranes doped with acids. Almost all known polymer membranes that are able to transport protons come into consideration as alkaline polymer membranes doped with acid. Here, acids are preferred, which are able to transport the protons without additional water, for example by means of the so called Grotthus mechanism.

As alkaline polymer according to the present invention, preferably an alkaline polymer with at least one nitrogen atom in a repeating unit is used.

According to a preferred embodiment, the repeating unit in the alkaline polymer contains an aromatic ring with at least one nitrogen atom. The aromatic ring is preferably a five-membered or six-membered ring with one to three nitrogen atoms, which may be fused to another ring, in particular another aromatic ring.

According to one particular aspect of the present invention, high-temperature-stable polymers are used, which contain at least one nitrogen, oxygen and/or sulphur atom in one or in different repeating units.

Within the context of the present invention, a high-temperature-stable polymer is a polymer which, as polymer electrolyte, can be operated over the long term in a fuel cell at temperatures above 120° C. Over the long term means that a membrane according to the invention can be operated for at least 100 hours, preferably at least 500 hours, at a temperature of at least 80° C., preferably at least 120° C., particularly preferably at least 160° C., without the performance being decreased by more than 50% based on the initial performance, which can be measured according to the method described in WO 01/18894 A2.

The above mentioned polymers can be used individually or as a mixture (blend). Here, preference is given in particular to blends which contain polyazoles and/or polysulphones. In this context, the preferred blend components are polyethersulphone, polyether ketone, and polymers modified with sulphonic acid groups, as described in the European patent application EP-A-1,337,319 and German patent application DE-A-10245451. By using blends, the mechanical properties can be improved and the material costs can be reduced.

Polyazoles constitute a particularly preferred group of alkaline polymers. An alkaline polymer based on polyazole contains recurring azole units of the general formula (I) and/or (II) and/or (III) and/or (IV) and/or (V) and/or (VI) and/or (VII) and/or (VIII) and/or (IX) and/or (X) and/or (XI) and/or (XII) and/or (XIII) and/or (XIV) and/or (XV) and/or (XVI) and/or (XVII) and/or (XVIII) and/or (XIX) and/or (XX) and/or (XXI) and/or (XXII)

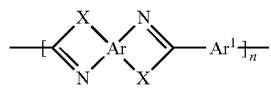
(I)

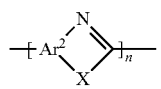
(II)

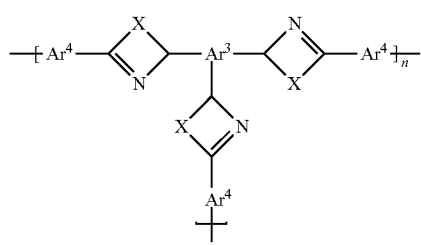
(III)

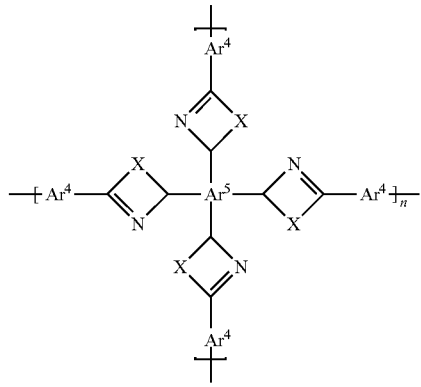
(IV)

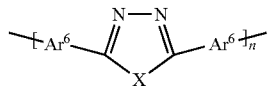
(V)

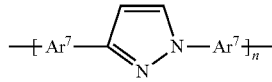
(VI)

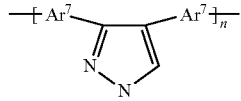
(VII)

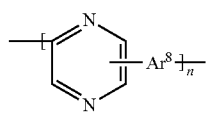
(VIII)

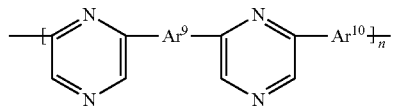
(IX)

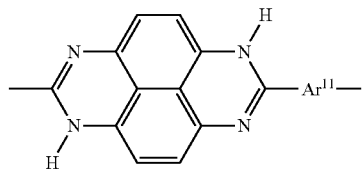
(X)

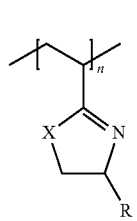
(XI)

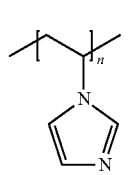
(XII)

-continued

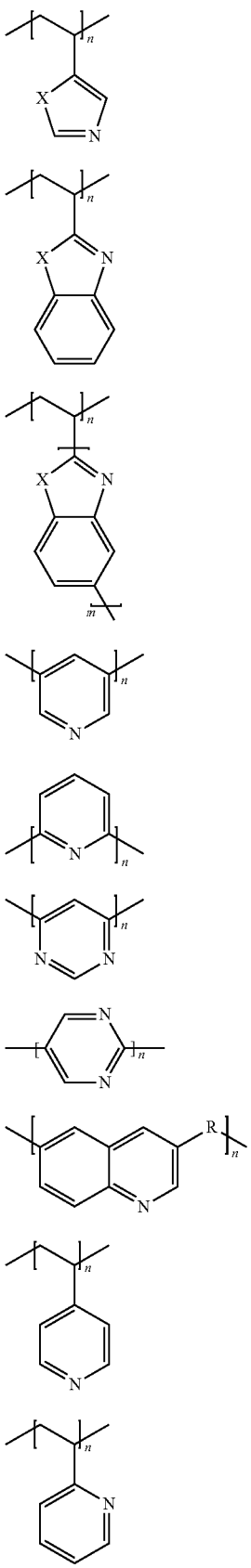

(XIII)
(XIV)
(XV)
(XVI)
(XVII)
(XVIII)
(XIX)
(XX)
(XXI)
(XXII)

in which
Ar are the same or different and are each a tetravalent aromatic or heteroaromatic group which may be mono- or polycyclic,
$Ar^1$ are the same or different and are each a divalent aromatic or heteroaromatic group which may be mono- or polycyclic,
$Ar^2$ are the same or different and are each a di- or trivalent aromatic or heteroaromatic group which may be mono- or polycyclic,
$Ar^3$ are the same or different and are each a trivalent aromatic or heteroaromatic group which may be mono- or polycyclic,
$Ar^4$ are the same or different and are each a trivalent aromatic or heteroaromatic group which may be mono- or polycyclic,
$Ar^5$ are the same or different and are each a tetravalent aromatic or heteroaromatic group which may be mono- or polycyclic,
$Ar^6$ are the same or different and are each a divalent aromatic or heteroaromatic group which may be mono- or polycyclic,
$Ar^7$ are the same or different and are each a divalent aromatic or heteroaromatic group which may be mono- or polycyclic,
$Ar^8$ are the same or different and are each a trivalent aromatic or heteroaromatic group which may be mono- or polycyclic,
$Ar^9$ are the same or different and are each a di- or tri- or tetravalent aromatic or heteroaromatic group which may be mono- or polycyclic,
$Ar^{10}$ are the same or different and are each a di- or trivalent aromatic or heteroaromatic group which may be mono- or polycyclic,
$Ar^{11}$ are the same or different and are each a divalent aromatic or heteroaromatic group which may be mono- or polycyclic,
X are the same or different and are each oxygen, sulfur or an amino group which bears a hydrogen atom, a group having 1-20 carbon atoms, preferably a branched or unbranched alkyl or alkoxy group, or an aryl group as further radical,
R is the same or different and is hydrogen, an alkyl group or an aromatic group, with the proviso that R in formula (XX) is not hydrogen, and
n, m are each an integer greater than or equal to 10, preferably greater than or equal to 100.

The term "azole" means that the polymer has at least one repeating unit comprising an aromatic ring in which at least one nitrogen heteroatom is present in said aromatic ring. Said at least one nitrogen heteroatom typically is bonded to hydrogen.

Preferred aromatic or heteroaromatic groups are derived from benzene, naphthalene, biphenyl, diphenyl ether, diphenylmethane, diphenyldimethylmethane, bisphenone, diphenylsulphone, chinoline, pyridine, bipyridine, pyridazin, pyrimidine, pyrazine, triazine, tetrazine, pyrole, pyrazole, anthracene, benzopyrrole, benzotriazole, benzooxathiadiazole, benzooxadiazole, benzopyridine, benzopyrazine, benzopyrazidine, benzopyrimidine, benzotriazine, indolizine, quinolizine, pyridopyridine, imidazopyrimidine, pyrazinopyrimidine, carbazole, aziridine, phenazine, benzoquinoline, phenoxazine, phenothiazine, acridizine, benzopteridine, phenanthroline and phenanthrene which optionally also can be substituted. In this case, $Ar^1$, $Ar^4$, $Ar^6$, $Ar^7$, $Ar^8$, $Ar^9$, $Ar^{10}$, $Ar^{11}$ can have any substitution pattern, in the case of phenylene, for example, $Ar^1$, $Ar^4$, $Ar^6$, $Ar^7$, $Ar^8$, $Ar^9$, $Ar^{10}$, $Ar^{11}$ can be ortho-, meta- and para-phenylene. Particularly preferred groups are derived from benzene and biphenylene, which may also be substituted.

Preferred alkyl groups are short-chain alkyl groups having from 1 to 4 carbon atoms, such as, e.g., methyl, ethyl, n-propyl or isopropyl and t-butyl groups.

Preferred aromatic groups are phenyl or naphthyl groups. The alkyl groups and the aromatic groups can be substituted.

Preferred substituents are halogen atoms such as, e.g., fluorine, amino groups, hydroxyl groups or short-chain alkyl groups such as, e.g., methyl or ethyl groups.

Polyazoles having recurring units of the formula (I) are preferred wherein the radicals X within one recurring unit are identical.

The polyazoles can in principle also have different recurring units wherein their radicals X are different, for example. It is preferable, however, that a recurring unit has only identical radicals X.

Further preferred polyazole polymers are polyimidazoles, polybenzothiazoles, polybenzoxazoles, polyoxadiazoles, polyquinoxalines, polythiadiazoles, poly(pyridines), poly(pyrimidines) and poly(tetrazapyrenes).

In another embodiment of the present invention, the polymer containing recurring azole units is a copolymer or a blend which contains at least two units of the formulae (I) to (XXII) which differ from one another. The polymers can be in the form of block copolymers (diblock, triblock), random copolymers, periodic copolymers and/or alternating polymers.

In a particularly preferred embodiment of the present invention, the polymer containing recurring azole units is a copolymer as described in U.S. patent application Ser. No. 13/769,413 which entire scope is hereby incorporated by reference.

In a particularly preferred embodiment of the present invention, the polymer containing recurring azole units is a polyazole, which only contains units of the formulae (I) and/or (II).

The number of recurring azole units in the polymer is preferably an integer greater than or equal to 10. Particularly preferred polymers contain at least 100 recurring azole units.

Within the scope of the present invention, polymers containing recurring benzimidazole units are preferred. Some examples of the most appropriate polymers containing recurring benzimidazole units are represented by the following formulae:

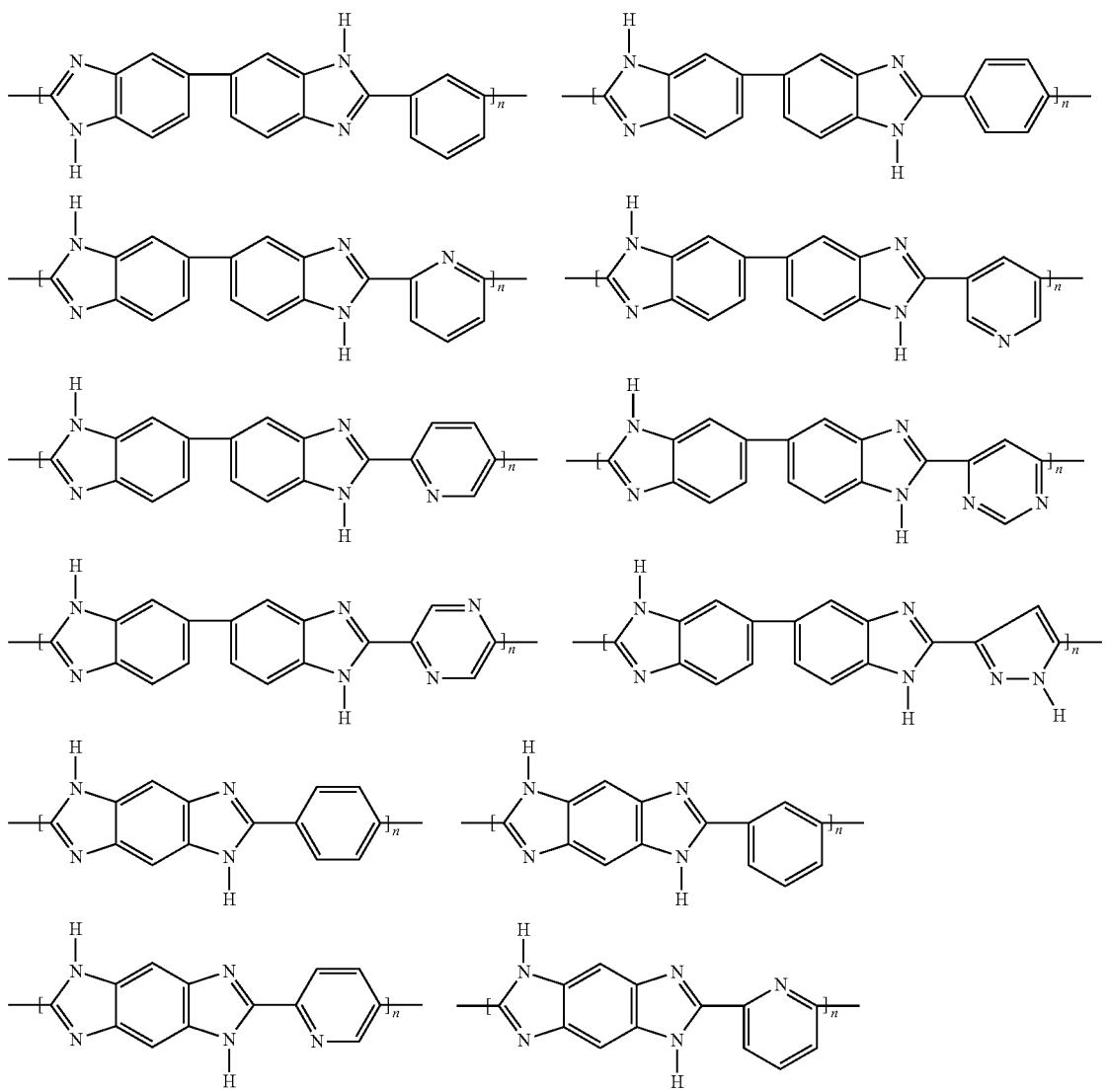

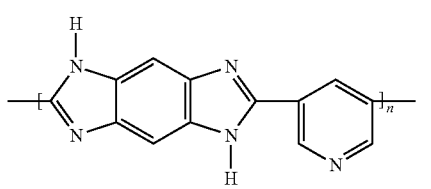
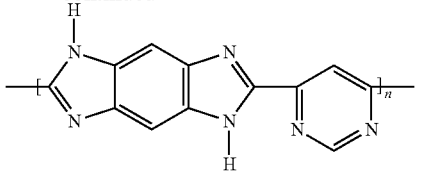
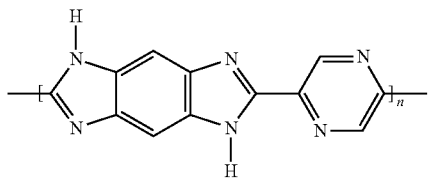
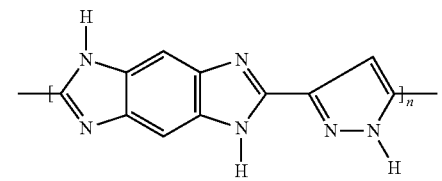
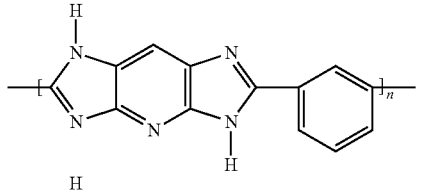
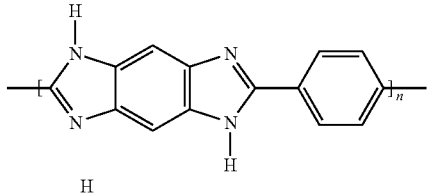
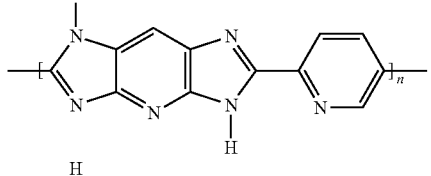
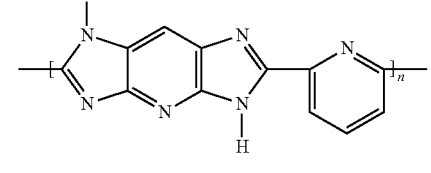
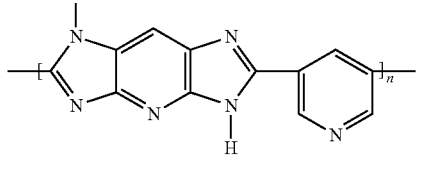
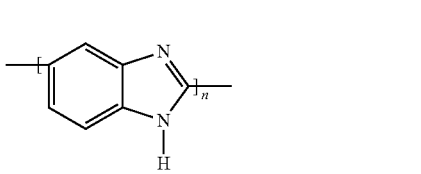
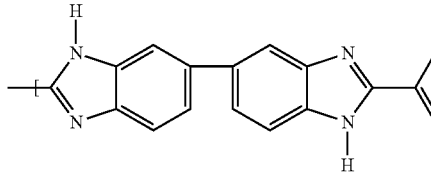
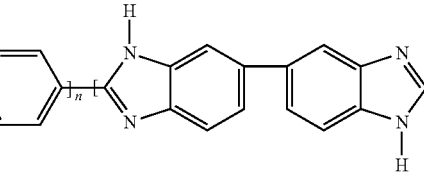
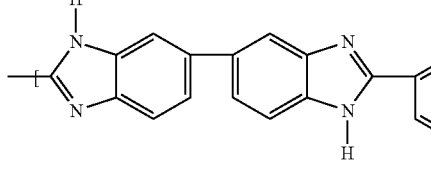
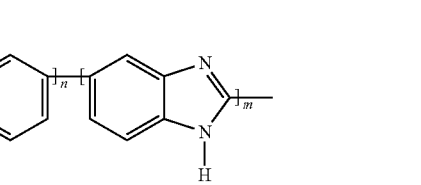

where n and m are each an integer greater than or equal to 10, preferably greater than or equal to 100.

The polyazoles used, in particular, however, the polybenzimidazoles are characterized by a high molecular weight. Measured as the intrinsic viscosity, this is preferably at least 0.2 dl/g, preferably 0.8 to 10 dl/g, in particular 1 to 10 dl/g.

The preparation of such polyazoles is known, wherein one or more aromatic tetra-amino compounds are reacted in the melt with one or more aromatic carboxylic acids or the esters thereof, containing at least two acid groups per carboxylic acid monomer, to form a prepolymer. The resulting prepolymer solidifies in the reactor and is then comminuted mechanically. The pulverulent prepolymer is usually end-polymerised in a solid-phase polymerisation at temperatures of up to 400° C.

The preferred aromatic carboxylic acids used according to the invention are, among others, dicarboxylic and tricarboxylic acids and tetracarboxylic acids or their esters or their anhydrides or their acid chlorides. The term aromatic carboxylics acid likewise also comprises heteroaromatic carboxylic acids.

Preferably, the aromatic dicarboxylic acids are isophthalic acid, terephthalic acid, phthalic acid, 5-hydroxyisophthalic acid, 4-hydroxyisophthalic acid, 2-hydroxyterephthalic acid, 5-aminoisophthalic acid, 5-N,N-dimethylaminoisophthalic acid, 5-N,N-diethylaminoisophthalic acid, 2,5-dihydroxyterephthalic acid, 2,6-dihydroxyisophthalic acid, 4,6-dihydroxyisophthalic acid, 2,3-dihydroxyphthalic acid, 2,4-dihydroxyphthalic acid, 3,4-dihydroxyphthalic acid, 3-fluorophthalic acid, 5-fluoroisophthalic acid, 2-fluoroterephthalic acid, tetrafluorophthalic acid, tetrafluoroisophthalic acid, tetrafluoroterephthalic acid, 1,4-naphthalenedicarboxylic acid, 1,5-naphthalenedicarboxylic acid, 2,6-naphthalenedicarboxylic acid, 2,7-naphthalenedicarboxylic acid, diphenic acid, 1,8-dihydroxynaphthalene-3,6-dicarboxylic acid, diphenyl ether-4,4'-dicarboxylic acid, benzophenone-4,4'-dicarboxylic acid, diphenylsulphone-4,4'-dicarboxylic acid, biphenyl-4,4'-dicarboxylic acid, 4-trifluoromethylphthalic acid, 2,2-bis-(4-carboxyphenyl) hexafluoropropane, 4,4'-stilbenedicarboxylic acid, 4-carboxycinnamic acid or their C1-C20 alkyl esters or C5-C12 aryl esters or their acid anhydrides or their acid chlorides.

The aromatic tricarboxylic acids, tetracarboxylic acids or their C1-C20 alkyl esters or C5-C12 aryl esters or their acid anhydrides or their acid chlorides are preferably 1,3,5-benzenetricarboxylic acid (trimesic acid), 1,2,4-benzenetricarboxylic acid (trimellitic acid), (2-carboxyphenyl)iminodiacetic acid, 3,5,3'-biphenyltricarboxylic acid; 3,5,4'-biphenyltricarboxylic acid.

The aromatic tetracarboxylic acids or their C1-C20 alkyl esters or C5-C12 aryl esters or their acid anhydrides or their acid chlorides are preferably 3,5,3',5'-biphenyltetracarboxylic acid, 1,2,4,5-benzenetetracarboxylic acid, benzophenonetetracarboxylic acid, 3,3',4,4'-biphenyltetracarboxylic acid, 2,2',3,3'-biphenyltetracarboxylic acid, 1,2,5,6-naphthalenetetracarboxylic acid, 1,4,5,8-naphthalenetetracarboxylic acid.

The heteroaromatic carboxylic acids are heteroaromatic dicarboxylic acids and tricarboxylic acids and tetracarboxylic acids or their esters or their anhydrides. Heteroaromatic carboxylic acids are understood to mean aromatic systems which contain at least one nitrogen, oxygen, sulphur or phosphor atom in the aromatic group. Preferably pyridine-2,5-dicarboxylic acid, pyridine-3,5-dicarboxylic acid, pyridine-2,6-dicarboxylic acid, pyridine-2,4-dicarboxylic acid, 4-phenyl-2,5-pyridinedicarboxylic acid, 3,5-pyrazoledicarboxylic acid, 2,6-pyrimidinedicarboxylic acid, 2,5-pyrazinedicarboxylic acid, 2,4,6-pyridinetricarboxylic acid, benzimidazole-5,6-dicarboxylic acid and their C1-C20 alkyl esters or C5-C12 aryl esters or their acid anhydrides or their acid chlorides are used.

The content of tricarboxylic acids or tetracarboxylic acids (based on dicarboxylic acid used) is between 0 and 30 mol-%, preferably 0.1 and 20 mol-%, in particular 0.5 and 10 mol-%.

The aromatic and heteroaromatic diaminocarboxylic acids used are preferably diaminobenzoic acid and its monohydrochloride and dihydrochloride derivatives. Preferably, mixtures of at least 2 different aromatic carboxylic acids are used. Particularly preferably, mixtures are used which also contain heteroaromatic carboxylic acids additionally to aromatic carboxylic acids. The mixing ratio of aromatic carboxylic acids to heteroaromatic carboxylic acids is from 1:99 to 99:1, preferably 1:50 to 50:1.

These mixtures are in particular mixtures of N-heteroaromatic dicarboxylic acids and aromatic dicarboxylic acids. Non-limiting examples of these are isophthalic acid, terephthalic acid, phthalic acid, 2,5-dihydroxyterephthalic acid, 2,6-dihydroxyisophthalic acid, 4,6-dihydroxyisophthalic acid, 2,3-dihydroxyphthalic acid, 2,4-dihydroxyphthalic acid, 3,4-dihydroxyphthalic acid, 1,4-naphthalenedicarboxylic acid, 1,5-naphthalenedicarboxylic acid, 2,6-naphthalenedicarboxylic acid, 2,7-naphthalenedicarboxylic acid, diphenic acid, 1,8-dihydroxynaphthalene-3,6-dicarboxylic acid, diphenyl ether-4,4'-dicarboxylic acid, benzophenone-4,4'-dicarboxylic acid, diphenylsulphone-4,4'-dicarboxylic acid, biphenyl-4,4'-dicarboxylic acid, 4-trifluoromethylphthalic acid, pyridine-2,5-dicarboxylic acid, pyridine-3,5-dicarboxylic acid, pyridine-2,6-dicarboxylic acid, pyridine-2,4-dicarboxylic acid, 4-phenyl-2,5-pyridinedicarboxylic acid, 3,5-pyrazoledicarboxylic acid, 2,6-pyrimidinedicarboxylic acid, 2,5-pyrazinedicarboxylic acid.

The preferred aromatic tetraamino compounds include, amongst others, 3,3',4,4'-tetraaminobiphenyl, 2,3,5,6-tetraaminopyridine, 1,2,4,5-tetraaminobenzene, 3,3',4,4'-tetraaminodiphenyl sulphone, 3,3',4,4'-tetraaminodiphenyl ether, 3,3',4,4'-tetraaminobenzophenone, 3,3',4,4'-tetraaminodiphenylmethane and 3,3',4,4'-tetraaminodiphenyldimethylmethane as well as their salts, in particular their monohydrochloride, dihydrochloride, trihydrochloride and tetrahydrochloride derivatives.

Preferred polybenzimidazoles are commercially available.

Preferred polymers include polysulphones, in particular polysulphone having aromatic and/or heteroaromatic groups in the backbone. According to a particular aspect of the present invention, preferred polysulphones and polyethersulphones have a melt volume rate MVR 300/21.6 of less than or equal to 40 cm³/10 min, in particular less than or equal to 30 cm³/10 min and particularly preferably less than or equal to 20 cm³/10 min, measured in accordance with ISO 1133. Here, preference is given to polysulphones with a Vicat softening temperature VST/A/50 of 180° C. to 230° C. In yet another preferred embodiment of the present invention, the number average of the molecular weight of the polysulphones is greater than 30,000 g/mol.

The polymers based on polysulphone include in particular polymers having recurring units with linking sulphone groups according to the general formulae A, B, C, D, E, F, G and/or H:

 (A)

 (B)

 (C)

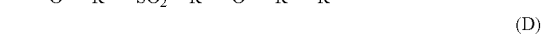 (D)

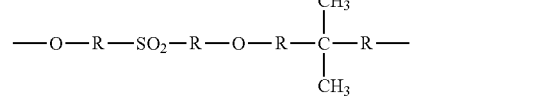

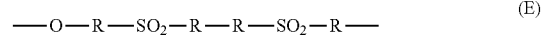 (E)

 (F)

(G)

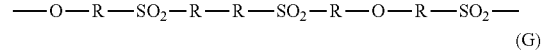 (H)

wherein the functional groups R, independently of another, are identical or different and represent aromatic or heteroaromatic groups.

Preferably the functional groups R in formulae A, B, C, D, E, F, G and/or H are 1,2-phenylene, 1,3-phenylene, 1,4-phenylene, 4,4'-biphenyl, pyridine, quinoline, naphthalene or phenanthrene. Most preferred are functional groups R in formulae A, B, C, D, E, F, G and/or H are 1,2-phenylene, 1,3-phenylene, 1,4-phenylene or 4,4'-biphenyl. In particular preferred are functional groups R in formulae C and H is 1,4-phenylene.

The polysulphones preferred within the scope of the present invention include homopolymers and copolymers, for example random copolymers. Particularly preferred polysulphones comprise recurring units of the formulae H to O:

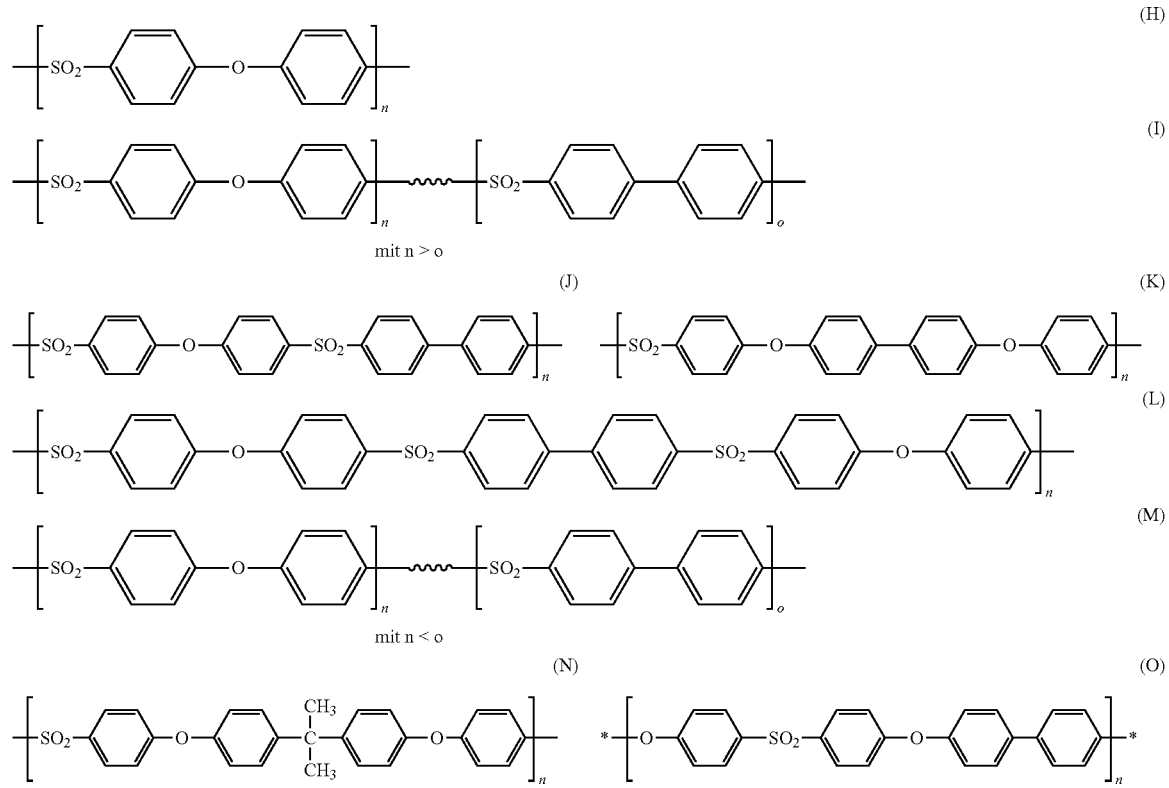

Most preferred are polysulphones of the formulae (K) and (O).

The polysulphones described above can be obtained commercially under the trade names ®Victrex 200 P, ®Victrex 720 P, ®Ultrason E, ®Ultrason S, ®Ultrason P, ®Mindel, ®Radel A, ®Radel R, ®Victrex HTA, ®Astrel and ®Udel.

Furthermore, polyether ketones, polyether ketone ketones, polyether ether ketones, polyether ether ketone ketones and polyaryl ketones are particularly preferred. These high-performance polymers are known per se and can be obtained commercially under the trade names Victrex® PEEK™, ®Hostatec, ®Kadel.

To produce polymer films, a polymer, preferably a polyazole can be dissolved in an additional step in polar, aprotic solvents such as dimethylacetamide (DMAc) and a film is produced by means of classical methods.

In order to remove residues of solvents, the film thus obtained can be treated with a washing liquid as is described in European patent application EP-A-1,368,845. Due to the cleaning of the polyazole film to remove residues of solvent described in the German patent application, the mechanical properties of the film are surprisingly improved. These properties include in particular the E-modulus, the tear strength and the break strength of the film.

Additionally, the polymer film can have further modifications, for example by cross-linking, as described in European patent application EP-A-1,373,379 or in WO 00/44816. In a preferred embodiment, the polymer film used consisting of an alkaline polymer and at least one blend component additionally contains a cross-linking agent, as described in European patent application EP-A-1,425,336.

The thickness of the polyazole films can be within wide ranges. Preferably, the thickness of the polyazole film before its doping with an acid is generally in the range of from 5 μm to 2000 μm, and particularly preferably 10 μm to 1000 μm; however, this should not constitute a limitation.

In order to achieve proton conductivity, these films are doped with acids. In this context, acids include all known Lewis- und Bransted acids, preferably inorganic Lewis- und Bransted acids.

Furthermore, the application of polyacids is also possible, in particular isopolyacids and heteropolyacids, as well as mixtures of different acids. Here, heteropolyacids according to the invention define inorganic polyacids with at least two different central atoms formed of weak, polyalkaline oxygen acid of a metal (preferably Cr, MO, V, W) and a non-metal (preferably As, I, P, Se, Si, Te) as partial mixed anhydrids. Amongst others, to this group belong the 12-phosphomolybdatic acid and the 12-phosphotungstic acid.

The degree of doping can influence the conductivity of the polyazole film. The conductivity increases with rising concentration of the doping substance until a maximum value is reached. According to the invention, the degree of doping is given as mole of acid per mole of repeating unit of the polymer. Within the scope of the present invention, a degree of doping between 3 and 50, particularly between 5 and 40 is preferred.

Particularly preferred doping substances are phosphoric and sulphuric acids, or compounds releasing these acids for example during hydrolysis, respectively. A very particularly preferred doping substance is phosphoric acid ($H_3PO_4$). Here, highly concentrated acids are generally used. According to a particular aspect of the present invention, the concentration of the phosphoric acid can preferably be at least 50% by weight, particularly at least 20% by weight, based on the weight of the doping substance.

Furthermore, proton conductive membranes can be obtained by a method comprising the steps:

I) Dissolving the polymers, particularly polyazoles in phosphoric acid
II) heating the mixture obtainable in accordance with step i) under inert gas to temperatures of up to 400° C.,
III) forming a membrane using the solution of the polyazole polymer in accordance with step II) on a support and
IV) treatment of the membrane formed in step III) until it is self-supporting.

Furthermore, doped polyazole films can be obtained by a method comprising the steps:

A) mixing one or more aromatic tetraamino compounds with one or more aromatic carboxylic acids or their esters, which contain at least two acid groups per carboxylic acid monomer, or mixing one or more aromatic and/or heteroaromatic diaminocarboxylic acids, in polyphosphoric acid with formation of a solution and/or dispersion,
B) applying a layer using the mixture in accordance with step A) to a support or to an electrode,
C) heating the flat structure/layer obtainable in accordance with step B) under inert gas to temperatures of up to 350° C., preferably up to 280° C., with formation of the polyazole polymer,
D) treatment of the membrane formed in step C) (until it is self-supporting).

The aromatic or heteroaromatic carboxylic acids and tetraamino compounds to be employed in step A) have been described above.

The polyphosphoric acid used in step I) and step A) is a customary polyphosphoric acid as is available, for example, from Riedel-de Haen. The polyphosphoric acids $H_{n+2}P_nO_{3n+1}$ (n>1) usually have a concentration of at least 83%, calculated as $P_2O_5$ (by acidimetry). Instead of a solution of the monomers, it is also possible to produce a dispersion/suspension.

The mixture produced in step A) has a weight ratio of polyphosphoric acid to the sum of all monomers of from 1:10,000 to 10,000:1, preferably 1:1,000 to 1,000:1, in particular 1:100 to 100:1.

The layer formation in accordance with step B) is performed by means of measures known per se (pouring, spraying, application with a doctor blade) which are known from the prior art of polymer film production. Every support that is considered as inert under the conditions is suitable as a support. To adjust the viscosity, phosphoric acid (conc. phosphoric acid, 85%) can be added to the solution, where required. Thus, the viscosity can be adjusted to the desired value and the formation of the membrane be facilitated.

The layer produced in accordance with step B) has a thickness of 20 to 4000 µm, preferably of 30 to 3500 µm, in particular of 50 to 3000 µm.

If the mixture in accordance with step A) also contains tricarboxylic acids or tetracarboxylic acid, branching/cross-linking of the formed polymer is achieved therewith. This contributes to an improvement in the mechanical property.

The treatment of the polymer layer produced in accordance with step C) in the presence of moisture at temperatures and for a period of time until the layer exhibits a sufficient strength for use in fuel cells. The treatment can be effected to the extent that the membrane is self-supporting so that it can be detached from the support without any damage.

The flat structure obtained in step B) is, in accordance with step C), heated to a temperature of up to 350° C., preferably up to 280° C. and particularly preferably in the range of 200° C. to 250° C. The inert gases to be employed in step C) are known to those in the field. Particularly nitrogen, as well as noble gases, such as neon, argon and helium belong to this group.

In a variant of the method, the formation of oligomers and polymers can already be brought about by heating the mixture resulting from step A) to a temperature of up to 350° C., preferably up to 280° C. Depending on the selected temperature and duration, it is than possible to dispense partly or fully with the heating in step C). This variant also subject of the present invention.

The treatment of the membrane in step D) is performed at temperatures in the range of 0° C. to 150° C., preferably at temperatures between 10° C. and 120° C., in particular between room temperature (20° C.) and 90° C., in the presence of moisture or water and/or steam and/or water-containing phosphoric acid of up to 85%. The treatment is preferably performed at normal pressure, but can also be carried out with action of pressure. It is essential that the treatment takes place in the presence of sufficient moisture whereby the polyphosphoric acid present contributes to the solidification of the membrane by means of partial hydrolysis with formation of low molecular weight polyphosphoric acid and/or phosphoric acid.

The partial hydrolysis of the organic phosphoric acid in step D) leads to a solidification of the membrane and a reduction in the layer thickness and the formation of a membrane having a thickness between 15 and 3000 µm, preferably between 20 and 2000 µm, in particular between 20 and 1500 µm, which is self-supporting. The intramolecular and intermolecular structures (interpenetrating networks IPN) that, in accordance with step B), are present in the polyphosphoric acid layer lead to an ordered membrane formation in step C), which is responsible for the special properties of the membrane formed.

The upper temperature limit for the treatment in accordance with step D) is typically 150° C. With extremely short action of moisture, for example from overheated steam, this steam can also be hotter than 150° C. The duration of the treatment is substantial for the upper limit of the temperature.

The partial hydrolysis (step D) can also take place in climatic chambers where the hydrolysis can be specifically controlled with defined moisture action. In this connection, the moisture can be specifically set via the temperature or saturation of the surrounding area in contact with it, for example gases such as air, nitrogen, carbon dioxide or other suitable gases, or steam. The duration of the treatment depends on the parameters chosen as aforesaid.

Furthermore, the duration of the treatment depends on the thickness of the membrane. Typically, the duration of the treatment amounts to between a few seconds to minutes, for example with the action of overheated steam, or up to whole days, for example in the open air at room temperature and lower relative humidity. Preferably, the duration of the treatment is 10 seconds to 300 hours, in particular 1 minute to 200 hours.

If the partial hydrolysis is performed at room temperature (20° C.) with ambient air having a relative humidity of 40-80%, the duration of the treatment is 1 to 200 hours. The membrane obtained in accordance with step D) can be formed in such a way that it is self-supporting, i.e. it can be detached from the support without any damage and then directly processed further, if applicable.

The concentration of phosphoric acid and therefore the conductivity of the polymer membrane according to the invention can be set via the degree of hydrolysis, i.e. the duration, temperature and ambient humidity. The concentration of the phosphoric acid is given as mole of acid per mole of repeating unit of the polymer. Membranes with a particularly high concentration of phosphoric acid can be obtained by the method comprising the steps A) to D). A concentration of 10 to 50 (mol of phosphoric acid related to a repeating unit of formula (I) for example polybenzimidazole), particularly between 12 and 40 is preferred. Only with very much difficulty or not at all is it possible to obtain such high degrees of doping (concentrations) by doping polyazoles with commercially available orthophosphoric acid.

According to a modification of the method described, wherein doped polyazole films are produced by using phosphoric acid, the production of these films can be carried out by a method comprising the following steps:

1) reacting one or more aromatic tetraamino compounds with one or more aromatic carboxylic acids or their esters which contain at least two acid groups per carboxylic acid monomer, or one or more aromatic and/or heteroaromatic diaminocarboxylic acids in the melt at temperatures of up to 350° C., preferably up to 300° C.,
2) dissolving the solid prepolymer obtained in accordance with step 1) in phosphoric acid
3) heating the solution obtainable in accordance with step 2) under inert gas to temperatures of up to 300° C., preferably up to 280° C., with formation of the dissolved polyazole polymer,
4) forming a membrane using the solution of the polyazole polymer in accordance with step 3) on a support and
5) treatment of the membrane formed in step 4) until it is self-supporting.

The steps of the method described under 1) to 5) have been explained in detail for the steps A) to D), where reference is made thereto, particularly with regard to the preferred embodiments.

A membrane, particularly a membrane based on polyazoles, can further be cross-linked at the surface by action of heat in the presence of atmospheric oxygen. This hardening of the membrane surface further improves the properties of the membrane. To this end, the membrane can be heated to a temperature of at least 150° C., preferably at least 200° C. and particularly preferably at least 250° C. In this step of the method, the oxygen concentration usually is in the range of 5 to 50% by volume, preferably 10 to 40% by volume; however, this should not constitute a limitation.

The cross-linking can also take place by action of IR or NIR (IR=infrared, i.e. light having a wavelength of more than 700 nm; NIR=near-IR, i.e. light having a wavelength in the range of about 700 to 2000 nm and an energy in the range of about 0.6 to 1.75 eV), respectively. Another method is β-ray irradiation. In this connection, the irradiation dose is from 5 and 200 kGy.

Depending on the degree of cross-linking desired, the duration of the cross-linking reaction can be within a wide range. In general, this reaction time lies in the range from 1 second to 10 hours, preferably 1 minute to 1 hour, without this being intended to represent any limitation.

The thickness of the polymer electrolyte membrane used in the present invention is from 50 to 1,000 μm, preferably from 100 to 500 μm.

Particularly preferred polymer membranes show a high performance. The reason for this is in particular improved proton conductivity. This is at least 100 mS/cm, preferably at least 110 mS/cm, in particular at least 120 mS/cm at temperatures of 120° C., preferably of 160° C. These values are achieved without moistening here.

Gas Diffusion Layer

The membrane electrode unit according to the invention has two gas diffusion layers which are separated by the polymer electrolyte membrane. Flat, electrically conductive and acid-resistant structures are commonly used for this. These include, for example, woven or non-woven textile surfaces comprising graphite and/or carbon fibers. Preferred are graphite-fibre paper, carbon-fibre paper, graphite fabric and/or paper which was rendered conductive by addition of carbon black. Most preferred are non-woven, in particular papers. Through these layers, a fine distribution of the flows of gas and/or liquid is achieved.

Generally, this layer has a thickness in the range of from 80 μm to 2000 μm, in particular 100 μm to 1000 μm and particularly preferably 150 μm to 500 μm.

According to a particular embodiment, at least one of the gas diffusion layers can be comprised of a compressible material. Within the scope of the present invention, a compressible material is characterized by the property that the gas diffusion layer can be compressed by pressure by at least 2% it's thickness, and in particular 5%-30% of its original thickness without losing its integrity.

This property is generally exhibited by a gas diffusion layer made of graphite fabric and/or paper which was rendered conductive by addition of carbon black.

In one embodiment of this invention, the limitation of at least on compressible gas diffusion layers can be obviated by selection of a new sub gasket design.

Catalyst Layer

The catalyst layer(s) contain(s) catalytically active substances. These include, amongst others, precious metals of the platinum group, i.e. Pt, Pd, Ir, Rh, Os, Ru, or also the precious metals Au and Ag. Furthermore, alloys of the above-mentioned metals may also be used. Additionally, at least one catalyst layer can contain alloys of the elements of the platinum group with non-precious metals, such as for example Fe, Co, Ni, Cr, Mn, Zr, Ti, Ga, V, etc. Furthermore, the oxides of the above-mentioned precious metals and/or non-precious metals can also be employed.

The catalytically active particles comprising the above-mentioned substances may be employed as metal powder, so-called black precious metal, in particular platinum and/or platinum alloys. Such particles generally have a size in the range from 5 nm to 200 nm, preferably in the range from 7 nm to 100 nm.

Furthermore, the metals can also be employed on a support material. Preferably, this support comprises carbon which particularly may be used in the form of carbon black, graphite or graphitised carbon black. Furthermore, electrically conductive metal oxides, such as for example, $SnO_x$, $TiO_x$, or phosphates, such as e.g. $FePO_x$, $NbPO_x$, $Zr_y(PO_x)_z$, can be used as support material. In this connection, the indices x, y and z designate the oxygen or metal content of the individual compounds which can lie within a known range as the transition metals can be in different oxidation stages.

The content of these metal particles on a support, based on the total weight of the bond of metal and support, is generally in the range of 1 to 80% by weight, preferably 5 to 60% by weight and particularly preferably 10 to 50% by weight; however, this should not constitute a limitation. The particle size of the support, in particular the size of the carbon particles, is preferably in the range of 20 to 1000 nm, in particular 30 to 100 nm. The size of the metal particles present thereon is preferably in the range of 1 to 20 nm, in particular 1 to 10 nm and particularly preferably 2 to 6 nm.

The sizes of the different particles represent mean values and can be determined via transmission electron microscopy or X-ray powder diffractometry.

The catalytically active particles set forth above can generally be obtained commercially.

Furthermore, the catalytically active layer may contain customary additives. These include, amongst others, fluoropolymers, such as e.g. polytetrafluoroethylene (PTFE) and fluorinated ethylene polypropylene (FEP) proton-conducting ionomers and surface-active substances.

According to a particular embodiment of the present invention, the weight ratio of fluoropolymer to catalyst material comprising at least one precious metal and optionally one or more support materials is greater than 0.1, this ratio preferably lying within the range of 0.2 to 0.6.

According to a particular embodiment of the present invention, the catalyst layer has a thickness in the range of 1 to 1000 μm, in particular from 5 to 500, preferably from 10 to 300 μm. This value represents a mean value, which can be determined by averaging the measurements of the layer thickness from photographs that can be obtained with a scanning electron microscope (SEM).

The catalyst layer is in general not self-supporting but is usually applied to the gas diffusion layer and/or the membrane, preferably the catalyst layer is on the gas diffusion layer, thus forming the gas diffusion electrode.

According to a particular embodiment of the present invention, the content of precious metals of the catalyst layer is 0.1 to 10.0 mg/cm$^2$, preferably 0.3 to 6.0 mg/cm$^2$ and particularly preferably 0.3 to 3.0 mg/cm$^2$. These values can be determined by elemental analysis of a flat sample.

For further information on membrane electrode units, reference is made to the technical literature, in particular the patent applications WO 01/18894 A2, DE 195 09 748, DE 195 09 749, WO 00/26982, WO 92/15121 and DE 197 57 492. The disclosure contained in the above-mentioned citations with respect to the structure and production of membrane electrode units as well as the electrodes, gas diffusion layers and catalysts to be chosen is also part of the description.

The electrochemically active surface of the catalyst layer defines the surface which is in contact with the polymer electrolyte membrane and at which the redox reactions set forth above can take place. The present invention allows for the formation of particularly large electrochemically active surfaces. According to a particular aspect of the present invention, the size of this electrochemically active surface is at least 2 cm$^2$, in particular at least 5 cm$^2$ and preferably at least 10 cm$^2$; however, this should not constitute a limitation. The instant method is particular suitable for larger electrochemically active surfaces which are at least 100 cm$^2$, preferably at least 200 cm$^2$.

The thickness of the gas diffusion layer having a catalyst layer coating (=gas diffusion electrode), which is the total of the thickness of the gas diffusion layer and the catalyst layer is from 100 to 700 μm, preferably from 200 to 500 μm.

Polymer Frame

The membrane electrode unit according to the invention having:
(i) two gas diffusion layers that are each in contact with a catalyst layer and being separated by a polymer electrolyte membrane,
(ii) both surfaces of the polymer electrolyte membrane are in contact with said catalyst layer, said catalyst layers being in contact with said gas diffusion layers,
(iii) the side surface of the polymer electrolyte membrane being surrounded by and in contact with the side surface of a polymer frame over its entire side surface,
(iv) the surface of said polymer frame overlapping with the outer peripheral area of the two gas diffusion layers that are each in contact with a catalyst layer,
(v) the thickness of the polymer frame and the polymer electrolyte membrane are about equal,
(vi) the polymer electrolyte membrane being operational above 100° C. without any humidification,
(vii) the polymer frame is made from polymers based on polysulphone.

The thickness of the polymer frame acting as subgasket in the present invention is from 20 to 300 μm, preferably from 30 to 100 μm. Said frame is preferably a polymer film having said thickness.

Generally, the polymer frame subgasket overlaps with the peripheral area of the gas diffusion layer/catalyst layer, said overlap being preferably at least 1 mm, preferably at least 1.5 mm, most preferred at least 2 mm. Since the overlap reduces the electrochemical active area of the MEU, the upper limit is merely depending on the economics. The skilled worker will select such upper limit on the particular field in which the MEU are used. The range of appropriate overlap between GDE and subgasket can range between 1.5 mm to 15 mm, and preferably from 2.5 to 5 mm. The particular overlap selected is dependent on the overall length and width of the MEU and final application.

The polysulphone forming the polymer frame subgasket exhibit a long-term service temperature of at least 160° C., preferable 180° C., more preferred at least 190° C., more preferably at least 220° C. and most preferably at least 250° C., measured in accordance with MIL-P-46112B, paragraph 4.4.5.

According to a preferred aspect of the present invention, the polysulphone polymer frame subgasket is a film having a tensile strength of at least 6 N/mm$^2$, preferably at least 7 N/mm$^2$, measured at 80° C., preferably 160° C., and an elongation of 100%. Measurement of these values is carried out in accordance with DIN EN ISO 527-1

According to a preferred aspect of the present invention, the polymer frame subgasket does not requires any additional coatings such as a meltable polymer coating. However, such additional coatings can be present and are preferably fluoropolymer, such as for example poly(tetrafluoroethylen-co-hexafluoropropylene) FEP, polyvinylidenefluoride PVDF, perfluoroalkoxy polymer PFA, poly(tetrafluoroethylen-co-perfluoro(methylvinylether)) MFA. These polymers are in many cases commercially available, for example under the trade names Hostafon®, Hyflon®, Teflon®, Dyneon® and Nowoflon®. The thickness of such coating is most typically at least 0.5 μm, in particular at least 2.5 μm.

The polysulphone polymer frame subgasket is usually in contact with electrically conductive separator plates which are typically provided with flow field channels on the sides facing the gas diffusion layers to allow for the distribution of reactant fluids. The separator plates are usually manufactured of graphite or conductive, thermally stable plastic.

Generally, interacting with the separator plates, the polymer frame seals the gas spaces against the outside. Furthermore, the polymer frame generally also seals the gas spaces between anode and cathode.

The polysulphone polymer frame subgasket contacts and overlaps the catalyst layer and/or the gas diffusion layer via the edge surfaces. The edge surfaces are those surfaces that are formed of the thickness of the electrode or the frame and the corresponding length or width of these layers.

Preferably, the polymer frame subgasket contacts and overlaps the catalyst layer and/or the gas diffusion layer via the surface that is defined by the length and the width of the frame or the electrode, respectively.

Preferably, the polysulphone polymer frame subgasket allows for a minimum controlled compression of the polymer electrolyte membrane, the polysulphone material of the polymer frame is a material which decreases in its thickness over a period of 5 hours, particularly preferably 10 hours, by not more than 5%, in particular not more than 2%, preferably not more than 1%, at a temperature of 120° C., particularly preferably 160° C., and a pressure of 10 N/mm², in particular 15 N/mm² and particularly preferably 20 N/mm². The aforementioned compression determined in accordance with the method disclosed in WO 2006/008158.

The thickness of the polymer frame and the polymer electrolyte membrane are about equal in the final MEU. Most typically the polymer electrolyte membrane has a higher thickness than the polymer frame. This allows to place polymer electrolyte membrane in the aperture formed by the polymer frame which are smaller than the aperture and be pressing the layered materials to from the final laminated MEU such space between the polymer frame and the polymer electrolyte membrane is filled by the compression and deformation of the polymer electrolyte membrane. The term "about equal" in the present invention means that thickness of the polysulphone polymer frame subgasket corresponds to the thickness of the polymer electrolyte membrane+/−5 μm or less, preferably +/−2 μm or less.

A further embodiment of the instant invention includes two additional polymer frame subgasket films being arranged between the surface of the aforementioned polysulphone polymer frame subgasket and the gas diffusion layer being in contact with a catalyst layer, the inner area of said additional polymer frame subgasket films overlaps with the outer peripheral area of the polymer electrolyte membrane, said overlap being preferably at least 1 mm, preferably at least 1.5 mm, most preferred at least 2 mm, and the outer area of said additional polymer frame subgasket films reaches over the top surface of the polysulphone polymer frame subgasket but does not extent outwards the polysulphone polymer frame subgasket. The additional polymer frame subgaskets films are made from the same polysulphones materials described for the polysulphone polymer frame subgaskets and preferably are made from the same polysulphones material.

The thickness of an additional polymer frame is from 20 to 300 μm, preferably from 30 to 100 μm, and can control the compression during lamination. Therefore the additional polymer frame is 5 to 50% thinner as the polymer frame.

The preferred embodiments of the additional polymer frame are the same as the preferred embodiments for the polysulphone polymer frame subgasket described above.

The present invention further relates to a process for the manufacture of a membrane electrode unit (MEU) according to the instant invention by known processes. Preferably the MEU according to the instant invention is manufactures as described in U.S. Patent Application Ser. No. 61/812,268 which disclosure is hereby incorporated by references.

General Test Methods:

Test Method for Ionic Conductivity

Ionic conductivities were measured via a four-probe through-plane bulk measurement using an AC Zahner IM6e impedance spectrometer that scanned a frequency range from 1 Hz to 100 KHz. A rectangular sample of membrane (3.5 cm×7.0 cm) was placed in a glass or polysulfone cell with four platinum wire current collectors. Two outer electrodes set 6.0 cm apart supplied current to the cell, while the two inner electrodes 2.0 cm apart on opposite sides of the membrane measured the voltage drop. To ensure a through-plane bulk measurement of the membrane ionic conductivity, the two outer electrodes are placed on opposite sides of the membrane and the two inner electrodes are arranged in the same manner. The reported conductivities were of pre-conditioned (dehydrated) membranes that were held at >100° C. for at least two hours. Proton conductivity was calculated using the following equation:

$$\sigma = D/(L*B*R)$$

Where D was the distance between the two test current electrodes, L was the thickness of the membrane, B was the width of the membrane, and R was the measured resistance. The membrane contains no additional proton-conducting fillers.

Test Method for Fuel Cell Performance

Fuel cell performance was measured in 50 cm² (active area 45.15 cm²) single stack fuel cells using test stations obtained from Plug Power or purchased from Fuel Cell Technologies. Polarization curves were obtained at various temperatures (120-180° C.) with hydrogen as a fuel and different oxidants (air or oxygen gas). Fuel cells were operated for at least 100 hours (break-in period) at 0.2 A/cm² at 180° C. before measurement of polarization curves. Long term stability testing was performed under static current and temperature conditions of 0.2 A/cm² and 180° C. with a constant flow rate of hydrogen (1.2 stoichiometric ratio) and air (2.0 stoichiometric ratio).

Test Method for Inherent Viscosity

The inherent viscosity, also referred to as intrinsic viscosity, was measured by placing a small amount of pulverized polymer (washed with distilled water until neutral to remove any mineral acids and dried for 12 hours at 120-130° C.)'. Solutions for inherent viscosity measurement were prepared by dissolving the neutralized polymer in concentrated sulfuric acid (96%) at a concentration of 0.2 g/dL. Inherent viscosity was measured by recording the flow times in the viscometer for the polymer solution and pure sulfuric acid using a suspended level Ubbelohde viscometer, size 200, at 30.0° C. in a temperature controlled water bath and was calculated according to the following equation:

$$\ln(t/t_0)/c = \text{inherent viscosity (dL/g)}$$

t (sec): solution flow time
$t_0$ (sec): solvent flow time (96% sulfuric acid)
c (g/dL): solution concentration Test Method for Titration The composition of the membrane was determined by titration with 0.1 M sodium hydroxide. The 0.1 M sodium hydroxide solution was prepared by dissolving 4 g sodium hydroxide in 1 liter distilled water and standardized by titration with a known amount of potassium hydrogen phthalate (predried at 110° C. for 1 hour). At least three circular samples with a diameter of 2 cm were cut from the bulk membrane. Every sample was weighed to obtain the initial weight, and then placed in 20 mL of distilled water and allowed to stir for at least 30 minutes. The samples were titrated using a Metrohm 716 DMS Titrino titrator. The first equivalence point was used to determine the volume of sodium hydroxide necessary for neutralization. The samples were washed thoroughly with distilled water and dried in a vacuum oven at 110° C. for at least eight hours. The samples were allowed to cool to room temperature in the vacuum oven before removal and were weighed to obtain the dry weight of the polymer.

Phosphoric acid doping levels, X, moles of phosphoric acid per mole of PBI repeat unit (X $H_3PO_4$/PBI) were calculated from the equation:

$$X = \frac{(V_{NaOH} \times C_{NaOH})}{\left(\frac{W_{dry}}{M_{polymer}}\right)}$$

where $V_{NaOH}$ and $C_{NaOH}$ are the volume and concentration of the sodium hydroxide solution required to neutralize the phosphoric acid to the first equivalence point, $W_{dry}$ is the dry weights of the polymer sample, and $M_{polymer}$ is the molecular weights of the polymer repeat unit.

The polymer weight percentage, phosphoric acid weight percentage, water weight percentage, and the concentration of phosphoric acid of the tested membranes were determined by the equations below:

$$\text{polymer \%} = \frac{W_{dry}}{W_{sample}} \times 100$$

$$\text{acid \%} = \frac{M_{acid} \times V_{NaOH} \times C_{NaOH}}{W_{sample}} \times 100$$

$$\text{water \%} = \frac{W_{sample} - W_{dry} - M_{acid} \times V_{NaOH} \times C_{NaOH}}{W_{sample}} \times 100$$

$$\text{Concentration}_{acid} \% = $$
$$\frac{W_{acid}}{W_{acid} + W_{H_2O}} \times 100 = \frac{M_{acid} \times V_{NaOH} \times C_{NaOH}}{W_{sample} - W_{dry}} \times 100$$

where $V_{NaOH}$ and $C_{NaOH}$ are the volume and concentration of the sodium hydroxide solution required to neutralize the phosphoric acid to the first equivalence point, $M_{acid}$ is the molecular weights of phosphoric acid, $W_{dry}$ is the dry weight of the polymer sample, and $W_{sample}$ is the total weight of the testing sample.

The thickness of the layers is determined with a digital thickness tester from the company Mitutoyo. The initial pressure of the two circular flat contact surfaces during measurement is 1 PSI, the diameter of the contact surface is 1 cm.

EXAMPLE

Example 1

Control Two commercially available gas diffusion electrodes produced according to patent application U.S. Pat. No. 6,103,077 are used whereby the anode contains a platinum on carbon catalyst and the cathode contains a platinum alloy on carbon catalyst. These electrodes are cut to 72 mm×72 mm.

A proton-conducting membrane produced according to the patent application EP-A-1,379,573 is used and cut to dimensions 72 mm×72 mm A first polymer frame gasket made of Kapton with a thin FEP coating is cut with outer dimensions 110 mm×110 mm and cut-out (aperture) 67.2 mm×67.2 mm. Following FIG. 2, the pre-cut Kapton piece is laminated to the electrode piece whereby 2.4 mm of the edge of the electrode is in contact to the inner edge of the Kapton piece. This is performed for both anode and cathode. These electrode-subgasket assemblies are placed with a membrane and laminated to form the membrane electrode unit.

A second polymer frame gasket made of PFA with a thickness of 400 μm.

The cut-out (aperture) of the first polymer frame gasket has a size of 73 mm×73 mm so that the clearance of the frame and the electrode is 0.5 mm on each side and outer dimensions of 110 mm×110 mm This is a sealing gasket that is placed on top of the sub gasket. Two are used: one each for anode and cathode side.

A ®Kapton sheet on top and bottom of MEU is to protect tray and platens from any acid that may come out. Thickness is typically 40 μm for ®Kapton sheets.

The arrangement is placed in a press (Toni Technik, 500 mm×600 mm, Titanium tray is placed onto Steel platens, added below) compressed with each other under defined pressure (~4 Mpa based on shim/template combo frame area) and duration (30 seconds) at a temperature of 140° C.

The active electrode surface is 45.16 cm² and a MEA similar to FIG. 1 is obtained.

Example 2: Counter Example

A MEU is made according to the process and materials of Example 1 except Ultrason E is employed as the subgasket.

Example 3: Preferred Configuration

A MEU is made according to the process and materials of Example 1 except Ultrason P is employed as the subgasket.

Example 4: Use of Subgasket to Align and Control Membrane Compression

Two commercially available gas diffusion electrodes produced according to patent application U.S. Pat. No. 6,103, 077 are used whereby the anode contains a platinum on carbon catalyst and the cathode contains a platinum alloy on carbon catalyst. These electrodes are cut to 72 mm×72 mm.

A proton-conducting membrane produced according to the patent application EP-A-1,379,573 is used and cut to dimensions 72 mm×72 mm A first polymer frame gasket made of Ultrason P 30 microns thick is cut with outer dimensions 110 mm×110 mm and cut-out (aperture) 67.2 mm×67.2 mm. Following FIG. 2, the pre-cut Ultrason P piece is laminated to the electrode piece whereby 2.4 mm of the edge of the electrode is in contact to the inner edge of the Ultrason P piece. This is performed for both anode and cathode.

A third polymer frame alignment gasket made of Ultrason P 100 microns thick is cut with outer dimensions 110 mm×110 mm and cut-out (aperture) 67.2 mm×67.2 mm. Following FIG. 3, a first electrode-sub gasket assembly is placed on a table and the 100 micron Ultrason P alignment gasket is placed on top. Next, a pre-cut membrane is placed inside the 100 micron cavity, followed by placement of the second electrode subgasket assembly. All three Ultrason P materials are laminated with the membrane to form the membrane electrode unit.

An additional polymer frame gasket made of PFA with a thickness of 400 μm is made. The cut-out (aperture) of the first polymer frame gasket has a size of 73 mm×73 mm so that the clearance of the frame and the electrode is 0.5 mm on each side and outer dimensions of 110 mm×110 mm This is a sealing gasket that is placed on top of the sub gasket. Two are used: one each for anode and cathode side.

The active electrode surface is 45.16 cm² and a MEA similar to FIG. 5 is obtained.

Example 5: Use of Subgasket to Align and Control Membrane Compression

A MEU similar to Example 4 is constructed, except the third polymer frame alignment gasket is made of Ultrason P 250 microns thick The performance of MEUs thus obtained is measured using standard fuel cell test hardware and low porosity graphite flow fields (Entegris-POCO graphite plates).

Results

Table 1 summarizes the stability of the polysulfone class of materials when subjected to the thermal and the chemical corrosive forces of phosphoric acid at 180° C. Coupons of material are cut, weighed, and measured prior to continuous immersion in the hot acid and then checked periodically in time. One notes that the polysulfones are the most stable class of materials evaluated.

However, materials that are fabricated into a membrane electrode unit are subject to additional electrochemical corrosive forces over time. FIG. 6 and FIG. 7 taken together show a clear advantage in stability of Ultrason P over Ultrason E and the polyimide Kapton coated with FEP. FIG. 6 is shows Ultrason P compared to Ultrason E after six polarization cycles whereby the current load is varied from zero to 0.7 A/cm². After just six cycles, MEUs with Ultrason E begin to degrade. This loss of integrity is made more evident after simple life testing as shown in FIG. 7. Here MEUs with Ultrason P, E, and FEP-coated Kapton are run under hydrogen air at 0.2 A/cm² whereby the voltage is recorded in time. The Ultrason E sample developed a catastrophic hydrogen leak while the Kapton MEA degraded more quickly than Ultrason P MEUs.

A post mortem analysis confirms that under electrochemical forces, Ultrason E is not as stable as Ultrason P. A picture of cracks that develop in the Ultrason E sub gasket after 1,000 hours of operation is shown in FIG. 8 while even after 2,000 hours of operation for Ultrason P, the sub gasket appears intact and malleable (see FIG. 9)

In addition to being superior in resistance to thermal, chemical, and electrochemical corrosion, an Ultrason P sub gasket can be fashioned into a membrane alignment element, and more importantly, an automatic means to control compression on the membrane over time. In the typical construction as shown in Example 1, compressible materials are used for the electrode, and the anode and cathode compress the membrane to a set level determined at fabrication. Since the membrane is >90% phosphoric acid, over time, this high compression can lead to loss of acid from the membrane into the electrodes. Also, during the fabrication step, great care must be maintained to set the compression through shims and a judicious selection of membrane and electrode thicknesses. If one compresses the membrane too much during fabrication, excess acid is released and the catalyst layer or micro porous layer becomes flooded, impeding gas distribution. Similarly, if there is not enough compression, one's catalyst is underutilized and performance of the MEU is low. Thus, FIG. 10 demonstrates that by assembling a MEU as in Example 4 (100 micron Ultrason P as an alignment element), one can maintain consistent compression during assembly. The higher reformate current at >0.5 A/cm² for the 100 micron spacer element supports this conclusion. The same is found in FIG. 11, now showing the cathode side improvement. FIGS. 12 and 13 demonstrate similar improvements now with a 250 micron spacer. Finally, FIG. 14 shows long term performance, especially the lower trace tracking cell resistance. The resistance remains relatively stable over time, supporting that by controlling membrane compression, more stable MEUs are possible.

TABLE 1

Thermal and Chemical Stability of polysulfone class. Three months in phosphoric acid at 180° C.

| Sample | Observation | Size | Thickness Initial > 1 week > 2 weeks > 1 month > 2 months > 3 months | Weight Initial > 1 week > 2 weeks > 1 month > 2 months > 3 months |
|---|---|---|---|---|
| Ultrason S | / | Change < 2% (<=1 mm) | 100%–>100%–>100%–>100%–>100% | 100%–>99.5%–>99.4%–>99.1%–>98.4% |
| Victrex | / | Change < 2% (<=1 mm) | 100%–>100%–>100%–>100%–>100% | 100%–>99.1%–>97.3%–>97.1%–>97.0% |
| Ultem | Color changed, brittle | Change < 2% (<=1 mm) | 100%–>98.7%–>97.4%–>97.4%–>94.8% | 100%–>99.2%–>98.2%–>95.1%–>92.7% |
| Polycarbonate | Disappeared | X | X | X |
| PVDF | color changed | Shrinkage (one side) 100%–>98.6%–>94.1% | 100%–>105%–>102%–>X | 100%–>96.7%–>96.4%–>X |
| PTFE | / | Change < 2% (<=1 mm) | 100%–>100%–>100%–>98.1%–>98.1% | 100%–>99.4%–>98.9%–>97.5%–>97.8% |
| FEP | / | Change < 2% (<=1 mm) | 100%–>100%–>98.1%–>96.2%–>96.2% | 100%–>94.6%–>91.5%–>92.2%–>93.2% |
| PFA | / | Change < 2% (<=1 mm) | 100%–>100%–>98.1%–>92.6%–>98.0% | 100%–>83.5%–>80.7%–>83.0%–>83.8% |
| Kapton (reference) | PTFE coating separated from base polyimide | Change < 2% (<=1 mm) | 100%–>84.1%–>79.5%–>50.0%–>44.45–>54.5% | 100%–>94.6%–>90.3%–>80.9%–>74.7%–>73.2% |

The invention claimed is:
1. A membrane electrode unit (MEU) having
   (i) two gas diffusion layers that are each in contact with a catalyst layer and being separated by a polymer electrolyte membrane,
   (ii) both surfaces of the polymer electrolyte membrane are in contact with said catalyst layer, said catalyst layers being in contact with said gas diffusion layers,
   (iii) the side surface of the polymer electrolyte membrane being surrounded by and in contact with the side surface of a polymer frame over its entire side surface,

(iv) the surface of said polymer frame overlapping with the outer peripheral area of the two gas diffusion layers that are each in contact with a catalyst layer,
(v) the thickness of the polymer frame and the polymer electrolyte membrane are about equal,
(vi) the polymer electrolyte membrane being operational above 100° C. without any humidification,
(vii) the polymer frame is made from polymers based on polysulphone and
(viii) two subgasket materials made of polysulphone being arranged between the surface of the polysulphone polymer frame and the gas diffusion layer being in contact with the catalyst layer wherein the inner area of said subgasket materials overlaps with outer peripheral area of the polymer electrotype membrane and said overlap being at least 1 mm, and
wherein the polysulphone forming the polymer frame contains recurring units with linking sulphone groups defined by the general formulae A, D, E and/or G

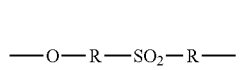

(A)

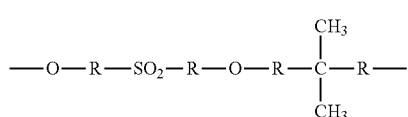

(D)

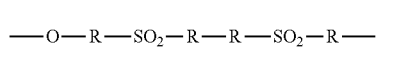

(E)

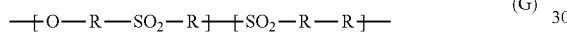

(G)

wherein the functional groups R, independently of another, are identical or different and represent aromatic or heteroaromatic groups and
wherein the two subgasket materials are the same polysulphone material as is for said polymer frame.

2. The membrane electrode unit as claimed in claim 1, wherein the functional groups R are 1,2-phenylene, 1,3-phenylene, 1,4-phenylene, 4,4'-biphenyl, pyridine, quinoline, naphthalene or phenanthrene.

3. The membrane electrode unit as claimed in claim 1, wherein the polymer electrolyte membrane comprises an alkaline polymer with at least one nitrogen atom per polymer repeating unit.

4. The membrane electrode unit as claimed in claim 1, wherein the polymer electrolyte membrane comprises an alkaline polymer having an aromatic ring with at least one nitrogen atom per polymer repeating unit, said aromatic ring being preferably a five membered or six-membered ring with one to three nitrogen atoms, which may be fused to another ring.

5. The membrane electrode unit as claimed in claim 1, wherein the polymer electrolyte membrane comprises an alkaline polymer based on polyazole contains recurring azole units of the general formula (I) and/or (II) and/or (III) and/or (IV) and/or (V) and/or (VI) and/or (VII) and/or (VIII) and/or (IX) and/or (X) and/or (XI) and/or (XII) and/or (XIII) and/or (XIV) and/or (XV) and/or (XVI) and/or (XVII) and/or (XVIII) and/or (XIX) and/or (XX) and/or (XXI) and/or (XXII)

(I)

-continued

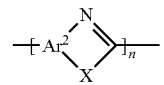
(II)

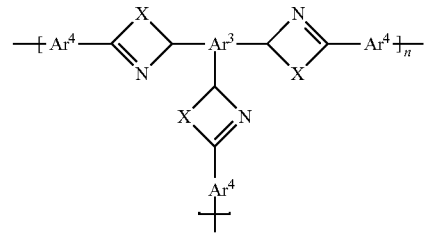
(III)

(IV)

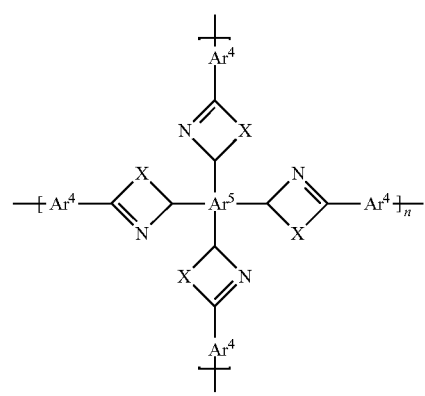

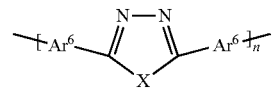
(V)

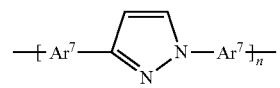
(VI)

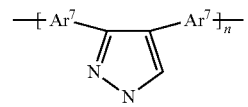
(VII)

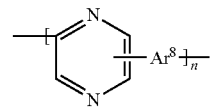
(VIII)

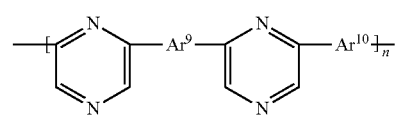
(IX)

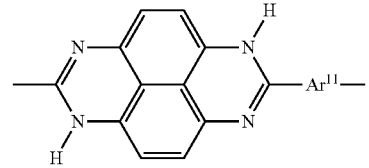
(X)

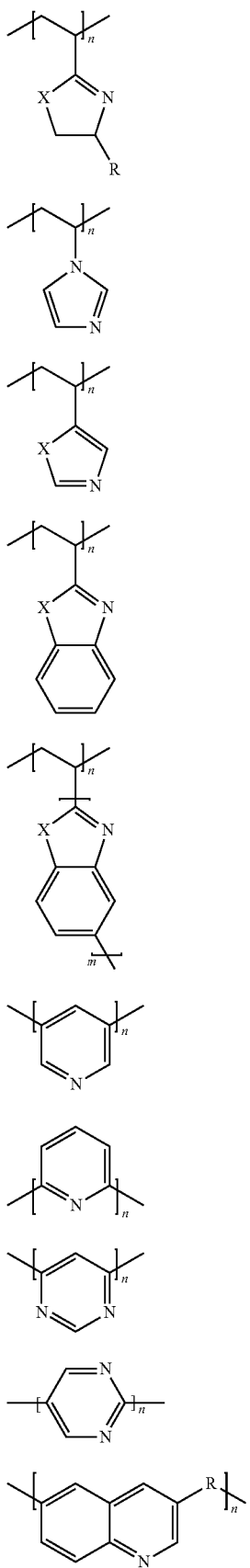

in which
Ar are the same or different and are each a tetravalent aromatic or heteroaromatic group which may be mono- or polycyclic,
Ar¹ are the same or different and are each a divalent aromatic or heteroaromatic group which may be mono- or polycyclic,
Ar² are the same or different and are each a di- or trivalent aromatic or heteroaromatic group which may be mono- or polycyclic,
Ar³ are the same or different and are each a trivalent aromatic or heteroaromatic group which may be mono- or polycyclic,
Ar⁴ are the same or different and are each a trivalent aromatic or heteroaromatic group which may be mono- or polycyclic,
Ar⁵ are the same or different and are each a tetravalent aromatic or heteroaromatic group which may be mono- or polycyclic,
Ar⁶ are the same or different and are each a divalent aromatic or heteroaromatic group which may be mono- or polycyclic,
Ar⁷ are the same or different and are each a divalent aromatic or heteroaromatic group which may be mono- or polycyclic,
Ar⁸ are the same or different and are each a trivalent aromatic or heteroaromatic group which may be mono- or polycyclic,
Ar⁹ are the same or different and are each a di- or tri- or tetravalent aromatic or heteroaromatic group which may be mono- or polycyclic,
Ar¹⁰ are the same or different and are each a di- or trivalent aromatic or heteroaromatic group which may be mono- or polycyclic,
Ar¹¹ are the same or different and are each a divalent aromatic or heteroaromatic group which may be mono- or polycyclic,
X are the same or different and are each oxygen, sulfur or an amino group which bears a hydrogen atom, a group having 1-20 carbon atoms,
R is the same or different and is hydrogen, an alkyl group or an aromatic group, with the proviso that R in formula (XX) is not hydrogen, and
n, m are each an integer greater than or equal to 10.

6. The membrane electrode unit as claimed in claim 1, wherein the polymer electrolyte membrane comprises Lewis- and Bransted acids, wherein the acids may be covalently bound to the polymers or imbibed and coordinated through acid-base interaction with the polymer forming the membrane.

7. The membrane electrode unit of claim 6, wherein the Lewis- and Bransted acids are inorganic Lewis- and Bransted acids.

8. The membrane electrode unit of claim 1, wherein the polymer electrolyte membrane has a proton conductivity of at least 100 mS/cm measured at temperatures of 120° C. without moistening.

9. The membrane electrode unit of claim 1, wherein the polymer electrolyte membrane has a thickness from 50 to 1,000 μm.

10. The membrane electrode unit of claim 1, wherein the gas diffusion layers have a thickness in the range of from 80 μm to 2000 μm.

11. The membrane electrode unit of claim 1, wherein the catalyst layer being on contact with the gas diffusion layers have a thickness in the range of 1 to 1000 μm.

12. The membrane electrode unit of claim 11, wherein the catalyst layer contain 0.1 to 10.0 mg/cm$^2$ of precious metals.

13. The membrane electrode unit of claim 11, wherein the thickness of the gas diffusion layer having a catalyst layer placed in step f) and o) is from 100 to 700 μm.

14. The membrane electrode unit of claim 1, wherein the polymer frame is made from polymer materials which exhibit a long-term service temperature of at least 160° C., measured in accordance with MIL-P-46112B, paragraph 4.4.5.

15. The membrane electrode unit as claimed in claim 1, wherein said overlap being at least 1.5 mm.

16. The membrane electrode unit as claimed in claim 1, wherein said overlap being at least 2 mm.

17. The membrane electrode unit as claimed in claim 1, wherein the outer area of said two subgasket materials made of polysulphone reaches over the top surface of the polysulphone polymer frame but does not extent outwards the polysulphone polymer frame.

18. The membrane electrode unit as claimed in claim 1, wherein the functional groups R, independently of another, are identical or different and represent 1,2-phenylene, 1,3-phenylene, 1,4-phenylene or 4,4'-biphenyl.

\* \* \* \* \*